(12) United States Patent
Shimizu

(10) Patent No.: US 8,959,751 B2
(45) Date of Patent: Feb. 24, 2015

(54) VEHICLE BODY ASSEMBLY LINE AND METHOD FOR ASSEMBLING VEHICLE BODY

(75) Inventor: Kenji Shimizu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 321 days.

(21) Appl. No.: 13/542,209

(22) Filed: Jul. 5, 2012

(65) Prior Publication Data

US 2013/0014370 A1 Jan. 17, 2013

(51) Int. Cl.
*B62D 65/18* (2006.01)
*B23P 11/00* (2006.01)
*B62D 65/06* (2006.01)

(52) U.S. Cl.
CPC ............... *B62D 65/18* (2013.01); *B62D 65/06* (2013.01); *B23P 2700/50* (2013.01)
USPC ............................. 29/564.1; 29/897.2; 29/791

(58) Field of Classification Search
USPC ............ 29/897.2, 429, 430, 431, 564, 564.1, 29/791, 793, 794
See application file for complete search history.

(56) References Cited

U.S. PATENT DOCUMENTS

| | | | |
|---|---|---|---|
| 4,589,184 A | 5/1986 | Asano et al. | |
| 4,589,199 A | 5/1986 | Ohtaki et al. | |
| 4,685,208 A * | 8/1987 | Sekiraku | ........................ 29/786 |
| 4,793,055 A * | 12/1988 | Shintani | ........................... 29/786 |
| 4,856,701 A * | 8/1989 | Pockl | .............................. 228/6.1 |
| 4,907,331 A * | 3/1990 | Kaibuki et al. | .............. 29/213.1 |
| 5,079,822 A | 1/1992 | Arai et al. | |
| 5,079,832 A * | 1/1992 | Ozawa et al. | ................... 29/712 |
| 5,123,148 A | 6/1992 | Ikeda et al. | |
| 5,210,931 A | 5/1993 | Ozawa et al. | |

FOREIGN PATENT DOCUMENTS

| | | |
|---|---|---|
| CN | 101522510 | 9/2009 |
| JP | 04-358976 | 12/1992 |

OTHER PUBLICATIONS

Chinese Office Action dated Feb. 25, 2014, 5 pages.

* cited by examiner

*Primary Examiner* — David Bryant
*Assistant Examiner* — Jason L Vaughan
(74) *Attorney, Agent, or Firm* — Rankin, Hill & Clark LLP

(57) ABSTRACT

Doors D (collectively representing doors D1 and D2) are removed from a vehicle body W, and are mounted to door holders 4 which are put laterally outside a base 2. While a carrier 1 is conveyed downstream with the door holders 4 kept holding the doors D and put outside the base 2 in the lateral directions, and, components are assembled to the doors D. Thereafter, the doors D to which the components are assembled are removed from the door holders 4, and are mounted to the vehicle body W.

9 Claims, 14 Drawing Sheets

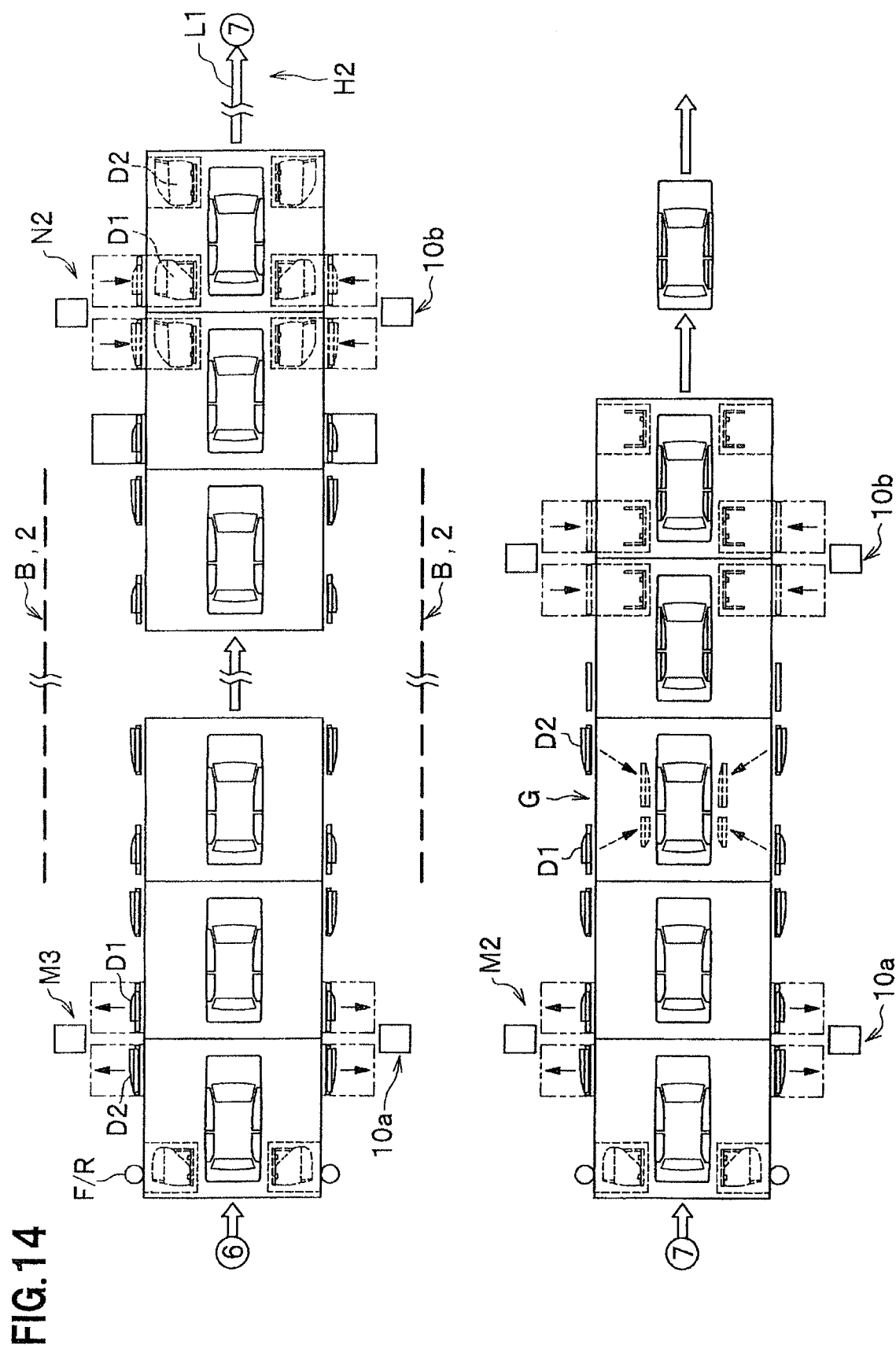

VEHICLE BODY ASSEMBLY LINE AND METHOD FOR ASSEMBLING VEHICLE BODY

CROSS-REFERENCE TO RELATED APPLICATIONS

The entire contents of Japanese Patent Application No. 2011-089762, filed on Apr. 14, 2011, are incorporated herein by reference.

BACKGROUND OF THE INVENTION

1. Field of the Invention

The present invention relates to a vehicle-body assembly line and a method for assembling a vehicle body. The present invention relates in particular to a vehicle-body assembly line and a method for assembling a vehicle body in which a vehicle body is placed on a base provided on a carrier for placing a vehicle body, and components are assembled to the vehicle body while the carrier is conveyed downstream.

2. Description of the Related Art

Patent Document 1 (Japanese Patent Application Laid-open No. H04-358976) discloses the following vehicle body assembly method. The vehicle body assembly method includes: a step of removing doors from a vehicle body on which coating is completed, and conveying the doors through a conveyor system to a first door storage apparatus; a step of taking out the doors from the first door storage apparatus to a door assembly line and assembling door components to the doors in the door assembly line; a step of conveying to a second door storage apparatus the doors to which the door components are assembled; and a step of taking out the doors from the second door storage apparatus, conveying the doors to an assembly area in which the doors are to be assembled to the vehicle body to which components assembly is completed, and assembling the doors to the vehicle body.

However, according to the technique disclosed in Patent Document 1, the conveyor system for the doors is required to be arranged, for example, between the stage of removing the doors from the vehicle body and the first door storage and between the second door storage and the stage of assembling the door to the vehicle body. Therefore, production of a door-conveyor hanger and construction of a conveyor are required, so that the cost is increased. In addition, the above technique needs a very large space for the construction of the conveyor. Further, the above technique needs separate construction of an door-component assembly line for assembling components to the doors removed from the vehicle body, so that the cost is increased.

The object of the present invention is to provide a vehicle-body assembly line and a method for assembling a vehicle body which enable cost reduction, space saving, and return of a door to a vehicle body after removal of the door from the vehicle body and assembly of a component to the door.

SUMMARY OF THE INVENTION

A vehicle-body assembly line according to the first invention includes: a carrier having a base for placing a vehicle body and a door holder movable laterally inside or outside the base and arranged for holding a door for the vehicle body, the vehicle body being to be placed on the base, the carrier being to be conveyed downstream, and a component being to be assembled to the vehicle body during conveying of the carrier; a vehicle-body-door removal stage for removing the door from the vehicle body, and mounting the door to the door holder that is put laterally outside the base; a door-component assembly line arranged on a downstream side of the vehicle-body-door removal stage for assembling the component to the door while the carrier is conveyed downstream with the door holder kept put laterally outside the base and holding the door; and a vehicle-body-door mounting stage arranged on a downstream side of the door-component assembly line for removing from the door holder the door having the component assembled thereto, and mounting the door to the vehicle body.

According to the first invention, the door is removed from the vehicle body, and is mounted to the door holder which is put laterally outside the base. While the carrier is conveyed downstream with the door holder kept put laterally outside the base and holding the door, the component are assembled to the door. Thereafter, the door to which the component is assembled is removed from the door holder, and is mounted to the vehicle body.

According to the first invention, the conveyor system for conveying the door to the door-component assembly line, which is conventionally necessary, is unnecessary. In addition, it is unnecessary to separately build a door-component assembly line.

Therefore, the first invention provides a vehicle-body assembly line which enables cost reduction, space saving, and return of the door to the vehicle body after removal of the door from the vehicle body and assembly of the component to the door.

The vehicle-body assembly line according to the first invention further includes door-holder in/out means arranged on both sides of the vehicle-body assembly line in a direction perpendicular to a direction of conveying the vehicle body in the vehicle-body assembly line for putting the door holder laterally inside or outside the base.

According to the above invention, the door holder is automatically put laterally inside or outside the base when the carrier reaches the positions at which the door-holder in/out means are arranged. In addition, it is sufficient to arrange the door-holder in/out means in only necessary positions, and it is unnecessary to arrange a door-holder in/out means for every door holder.

In the vehicle-body assembly line according to the first invention, the door-holder in/out means include door-holder putting-out means for putting laterally the door holder laterally outside the base and door-holder putting-in means for putting the door holder laterally inside the base.

According to the above invention, the door holder is automatically put laterally outside the base when the carrier reaches the positions at which the door-holder putting-out means are arranged, and is automatically put laterally inside the base when the carrier reaches the positions at which the door-holder putting-in means are arranged.

In the vehicle-body assembly line according to the first invention, the door-component assembly line is divided into multiple lines which are separately arranged.

According to the above invention, it is capable of coping with the case where the process layout does not allow sequential arrangement of the door-component assembly line. That is, according to the above invention, the assembly of the component to the door is performed in multiple separated operations. For example, it is capable of coping with a vehicle-body assembly method in which in the middle of the assembly of the component to the door, the door removed from the vehicle body are brought inside the carrier, and the component is assembled to the vehicle body with the door removed from the vehicle body received in the carrier.

In the vehicle-body assembly line according to the first invention, the door holder holds the door in a horizontal position when the door holder holds the door with the door holder put laterally inside the base, and the door holder holds the door in an upright position when the door holder holds the door with the door holder put laterally outside the base.

According to the above invention, the door is put laterally inside the base and held in the horizontal position when the door is held without assembly of the component to the door. Therefore, the door is compactly stored without interference with operations on the vehicle body such as assembly of the component to the vehicle body. On the other hand, the door is put laterally outside the base and held in the upright position when the door is held for assembly of the component to the door. That is, the door is be held in a position suitable for the operation for assembly of the component to the door.

A method for assembling a vehicle body according to the second invention includes: a step for providing a carrier comprising a base for placing a vehicle body and a door holder movable laterally inside or outside the base for holding a door for the vehicle body, the vehicle body being to be placed on the base, the carrier being to be conveyed downstream, and a component being to be assembled to the vehicle body during conveying of the carrier; a vehicle-body-door removal step for removing the door from the vehicle body, and mounting the door to the door holder that is put laterally outside the base: a door-component assembly step, executed after the vehicle-body-door removal step, for assembling the component to the door while the carrier is conveyed downstream with the door holder kept put laterally outside the base and holding the door; and a vehicle-body-door mounting step, executed after the door-component assembly step, for removing from the door holder the door having the component assembled thereto, and mounting the door to the vehicle body.

According to the second invention, the door is removed from the vehicle body, and mounted to the door holder which is put laterally outside the base. While the carrier is conveyed downstream with the door holder kept put laterally outside the base and holding the door, the component is assembled to the door. Thereafter, the door to which the component is assembled is removed from the door holder, and is mounted to the vehicle body.

According to the first invention, the conveyor system for conveying the door to the door-component assembly line, which is conventionally necessary, is unnecessary. In addition, it is unnecessary to separately build a door-component assembly line.

Therefore, the second invention provides a method for assembling a vehicle body which enables cost reduction, space saving, and return of the door to the vehicle body after removal of the door from the vehicle body and assembly of the component to the door.

In the method for assembling a vehicle body according to the second invention: the vehicle-body-door removal step is executed as an initial step in a vehicle-body assembly line; and the method further comprises, between the vehicle-body-door removal step and the door-component assembly step, a door-holder putting-in step, executed after the vehicle-body-door removal step, for putting the door holder holding the door laterally inside the base; a door-holder reception keeping step, executed after the door holder putting-in step, for keeping the door holder holding the door put laterally inside the base; and a door-holder putting-out step, executed after the door-holder reception keeping step, for putting the door holder holding the door laterally outside the base.

According to the above invention, it is capable of coping with the case where the final step in the door-component assembly step and the vehicle-body-door mounting step are sequentially arranged. In this case, immediately after the assembly of the component to the door is completed, the door is mounted to the vehicle body.

That is, according to the above invention, it is capable of coping with, for example, the case where a large component such as an instrument panel or a roof lining is assembled to the vehicle body in an upstream area in the vehicle-body assembly line, before the door-component assembly step, by robots arranged on one side of the vehicle-body assembly line with the door removed from the vehicle body received in the carrier.

In the method for assembling a vehicle body according to the second invention: the vehicle-body-door removal step is executed as an initial step in a vehicle-body assembly line; and the method further comprises, between the door-component assembly step and the vehicle-body-door mounting step, a second door-holder putting-in step, executed after the door-component assembly step, for putting the door holder holding the door laterally inside the base; a second door-holder reception keeping step, executed after the second door holder putting-in step, for keeping the door holder holding the door put laterally inside the base, and a second door-holder putting-out step, executed after the second door-holder reception keeping step, for putting the door holder holding the door laterally outside the base.

According to the above invention, it is capable of coping with the case where the process layout does not allow sequential arrangement of the final step in the door-component assembly step and the vehicle-body-door mounting step. That is, according to the above invention, it is capable of coping with, for example, the case where a large component such as tires, bumpers, seats, or a windshield is assembled to the vehicle body in a downstream area in the vehicle-body assembly line after the door-component assembly step by robots arranged on one side of the vehicle-body assembly line with the door removed from the vehicle body received in the carrier.

In the method for assembling a vehicle body according to the second invention: the vehicle-body-door removal step is executed as an initial step in a vehicle-body assembly line; the door-component assembly step includes a first door-component assembly step for assembling a first component to the door and a second door-component assembly step for assembling a second component to the door; and the method further comprises, between the first door-component assembly step and the second door-component assembly step, a third door-holder putting-in step, executed after the first door-component assembly step, for putting the door holder holding the door laterally inside the base; a third door-holder reception keeping step, executed after the third door holder putting-in step, for keeping the door holder holding the door put laterally inside the base; and a third door-holder putting-out step, executed after the third door-holder reception keeping step, for putting the door holder holding the door laterally outside the base.

According to the above invention, it is capable of coping with the case where the process layout does not allow sequential arrangement of the door-component assembly step. That is, according to the above invention, the assembly of the component to the door is performed in multiple separated operations. For example, it is capable of coping with a vehicle-body assembly method in which in the middle of the assembly of the component to the door, the door removed from the vehicle body is brought inside the carrier, and the component is assembled to the vehicle body with the door removed from the vehicle body received in the carrier.

The present invention described above provides a vehicle-body assembly line and a method for assembling a vehicle body which enable cost reduction, space saving, and return of the door back to the vehicle body after removal of the door from the vehicle body and assembly of the component to the door.

BRIEF DESCRIPTION OF THE DRAWINGS

FIG. 14 is a diagram following the FIG. 13 and indicating a part of the layout of the vehicle-body assembly line according to the fourth embodiment of the present invention.

DETAILED DESCRIPTION OF THE PREFERRED EMBODIMENTS

The embodiments of the present invention are explained below with reference to the accompanying drawings as needed.

First Embodiment

Figure 1:
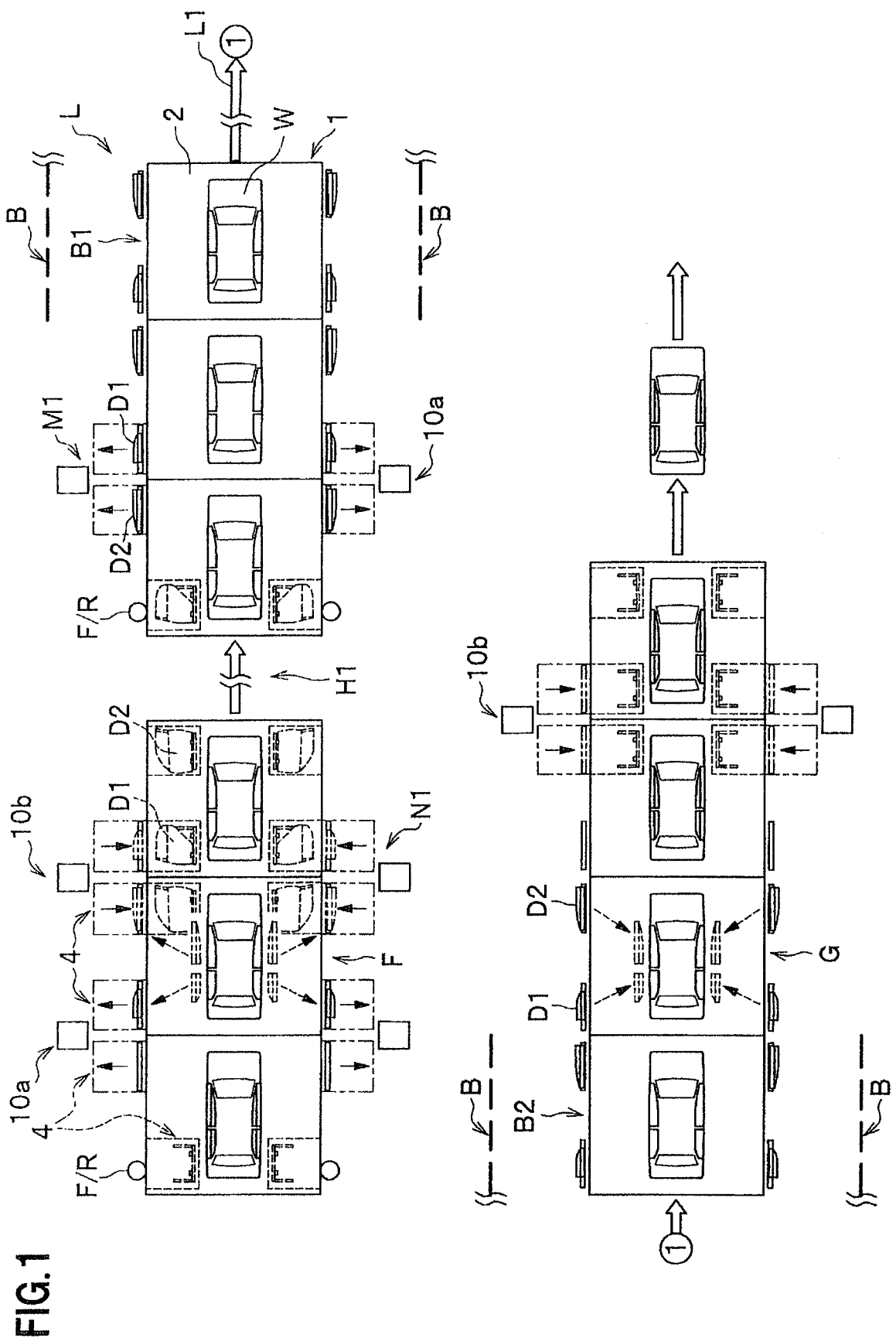
FIG. 1 is a diagram indicating a layout of a vehicle-body assembly line according to a first embodiment of the present invention.

FIG. 1 is a diagram indicating a layout of a vehicle-body assembly line L according to the first embodiment of the present invention.

A vehicle body W which has been coated in a coating line (not shown) is conveyed by a conveyor (not shown) to the vehicle-body assembly line L.

As illustrated in FIG. 1, in the vehicle-body assembly line L, the vehicle body W is conveyed with being placed on a conveyor pallet (carrier) 1. The conveyor pallet 1 is conveyed by a known friction conveyor, which uses rotationally driven friction rollers F/Rs.

The vehicle body W is raised or lowered by a lift mechanism 3 arranged on a base 2 of the conveyor pallet 1. (See FIGS. 2 to 4 for the lift mechanism 3.) In each stage (in which a step is executed) of the vehicle-body assembly line L, the vehicle body W is held at an raised or lowered position suitable for assembly of various components, and components are assembled to the vehicle body W.

That is, in the vehicle-body assembly line L, the vehicle body W is placed on the base 2 of the conveyor pallet 1, and components are assembled to the vehicle body W while the conveyor pallet 1 is conveyed downstream. The base 2 is provided in the conveyor pallet 1 for placing the vehicle body W.

Door holders 4 are arranged on the conveyor pallet 1 for holding doors D for the vehicle body W. The door holders 4 are movable laterally inside or outside of the base 2. (The doors D include rear doors D1 and front doors D2, which are explained later.) Specifically, the door holders 4 are arranged on the conveyor pallet 1 in the vicinities of the sides of the base 2 in parallel with the vehicle-body conveying direction L1 in such a manner that the door holders 4 are put laterally outside or inside of the base 2 (in the plan view). (The vehicle-body conveying direction L1 is the direction in which the vehicle body W on the base 2 is conveyed.) Two door holders 4 (one on the upstream side and the other on the downstream side in the vehicle-body conveying direction L1) are arranged on each of the left and right sides (with respect to the vehicle-body conveying direction L1) of the conveyor pallet 1. That is, four door holders 4 in total are arranged on the conveyor pallet 1.

In the conveyor pallet 1, ones of the door holders 4 arranged upstream of the other in the vehicle-body conveying direction L1 on the left and right sides of the conveyor pallet 1 respectively hold the rear doors D1 on the corresponding sides, and the door holders 4 arranged downstream of the other in the vehicle-body conveying direction L1 on the left and right sides of the conveyor pallet 1 respectively hold the front doors D2 on the corresponding sides.

In addition, door-holder in/out mechanisms (the door-holder in/out means) 10 for putting the door holders 4 laterally inside or outside the base 2 are arranged at predetermined positions on both sides of the vehicle-body assembly line L (where the sides are opposed in the direction perpendicular to the vehicle-body conveying direction). (The door-holder in/out mechanisms 10 include door-holder putting-out mechanisms (the door-holder putting-out means) 10a and door-holder putting-in mechanisms (the door-holder putting-in means) 10b.)

Therefore, when the conveyor pallet 1 reaches the positions at which the door-holder putting-out mechanisms 10a are arranged, the door holders 4 are automatically put laterally outside the base 2. In addition, when the conveyor pallet 1 reaches the positions at which the door-holder putting-in mechanisms 10b are arranged, the door holders 4 are automatically put laterally inside the base 2.

Further, in a vehicle-body-door removal stage F (which is the initial stage in the vehicle-body assembly line L), the door holders 4 are laterally drawn out from the base 2 to the outside of the base 2 (drawn out from the inside of the conveyor pallet 1), and the doors D are removed from the vehicle body W. Then, the doors D are mounted to the door holders 4 and held by the door holders 4. Thereafter, the door holders 4 holding the doors D are again laterally pushed to the inside of the base 2 (so as to be received in the conveyor pallet 1).

A door-holder putting-in stage N1 is arranged immediately downstream of the vehicle-body-door removal stage F. In the door-holder putting-in stage N1, the door holders 4 holding the doors D are put laterally inside the base 2.

Thereafter, while the conveyor pallet 1 is conveyed downstream in the vehicle-body assembly line L, components (constituents of the vehicle body) are assembled to the vehicle body W in each stage.

A door-holder reception keeping stage H1 is arranged downstream of the door-holder putting-in stage N1. In the door-holder reception keeping stage H1, the door holders 4 holding the doors D are kept put inside the base 2 in lateral directions. In the door-holder reception keeping stage H1, components are enabled to be assembled to the vehicle body W with the doors D removed from the vehicle body W received in the conveyor pallet 1.

As mentioned before, the vehicle-body-door removal stage F is arranged as the initial stage in the vehicle-body assembly line L. On the other hand, a vehicle-body-door mounting stage G is arranged in the vicinity of the final stage in the vehicle-body assembly line L. In the vehicle-body-door mounting stage G, the doors D to which components are assembled are removed from the door holders 4, and are then mounted to the vehicle body W.

In addition, a door-holder putting-out stage M1 is arranged midway along the vehicle-body assembly line L (downstream of the door-holder reception keeping stage H1). In the door-holder putting-out stage M1, the door holders 4 holding the doors D are laterally put outside the base 2. Further, door-component assembly lines (steps) B for assembling components (door constituents) to the doors D are arranged between the door-holder putting-out stage M1 and the vehicle-body-door mounting stage G on both sides of the base 2 of the conveyor pallet 1.

Although details are explained later, the doors D are held in the horizontal positions with the door holders 4 holding the doors D put inside the base 2 in the lateral directions, and are held in the vertical positions with the door holders 4 holding the doors D put outside the base 2 in the lateral directions.

Next, the operations on the vehicle-body assembly line L are explained below. The operations of the respective parts of the vehicle-body assembly line L are controlled by a control means, which is not shown.

In the vehicle-body-door removal stage F, the door holders 4 are laterally drawn out of the base 2 in the conveyor pallet 1 by the door-holder putting-out mechanisms 10*a*, and then the doors D are removed from the vehicle body W and mounted to the door holders 4. Since the doors D are removed from the vehicle body W, it is possible to perform many operations such as assembly of components (constituents of the vehicle body) to the vehicle body. In the door-holder putting-in stage N1, the door holders 4 holding the doors D are laterally pushed to the inside of the base 2, so that the door holders 4 come to be received in the conveyor pallet 1 again.

Then, the conveyor pallet 1 is conveyed downstream through the door-holder reception keeping stage H1 in the vehicle-body assembly line L. When the conveyor pallet 1 reaches the door-holder putting-out stage M1, which is arranged at the upstream ends of the door-component assembly lines B, the door holders 4 are drawn out of the conveyor pallet 1, and maintained on both sides of the base 2 of the conveyor pallet 1 in a state in which the doors D are held upright (perpendicular to the horizontal plane). Thus, the door-component assembly lines B are formed.

In the door-component assembly lines B, while the conveyor pallet 1 is conveyed downstream with the door holders 4 kept put outside the base 2 in the lateral directions and holding the doors D and, components are assembled to the doors D by workers.

On the other hand, while the vehicle body W placed on the base 2 of the conveyor pallet 1 is conveyed downstream in the vehicle-body assembly line L, components are assembled to the vehicle body W in each stage by workers.

Specifically, in the door-holder reception keeping stage H1, components are assembled to the vehicle body W with the doors D removed from the vehicle body W received in the conveyor pallet 1. The assembly of components to the vehicle body W is also performed in the section of the vehicle-body assembly line L having the door-component assembly lines B on both sides.

The doors D to which the components assembly is completed are mounted to the vehicle body W to which the components assembly is completed. The door-holder putting-in mechanisms 10*b* laterally pushes into the inside of the base 2 the door holders 4 from which the doors D are detached, so that the door holders 4 come to be received in the conveyor pallet 1. Then, the vehicle body W to which the doors D are mounted assembled is further conveyed downstream in the vehicle-body assembly line L.

In the vehicle-body assembly line L described above, the conventional conveyor system conveying doors to a door-component assembly line is unnecessary, and separate construction of a door-component assembly line is also unnecessary. Therefore, the problems of the aforementioned conventional techniques are overcome.

Next, the door-holder in/out mechanisms 10 are explained in detail below.

The door-holder in/out mechanisms 10 include the door-holder putting-out mechanisms 10*a* and the door-holder putting-in mechanisms 10*b*. The door-holder putting-out mechanisms 10*a* put the door holders 4 laterally outside the base 2, and the door-holder putting-in mechanisms 10*b* put the door holders 4 laterally inside the base 2.

As indicated in FIG. 1, in the vehicle-body assembly line L, the door-holder putting-out mechanisms 10*a* are arranged immediately upstream of the vehicle-body-door removal stage F, and the door-holder putting-in mechanisms 10*b* are arranged immediately downstream of the vehicle-body-door removal stage F. In addition, the door-holder putting-out mechanisms 10*a* are also arranged in the door-holder putting-out stage M1 (which is arranged at the upstream ends of the door-component assembly lines B), and on the downstream side of the vehicle-body-door mounting stage G (which is arranged at the downstream ends of the door-component assembly lines B).

The door-holder putting-out mechanisms 10*a* and the door-holder putting-in mechanisms 10*b* have the identical constructions. Therefore, hereinafter, explanation on only the door-holder putting-out mechanisms 10*a* are indicated with reference to FIGS. 2 to 4, and explanation on the door-holder putting-in mechanisms 10*b* is omitted.

Figure 2:
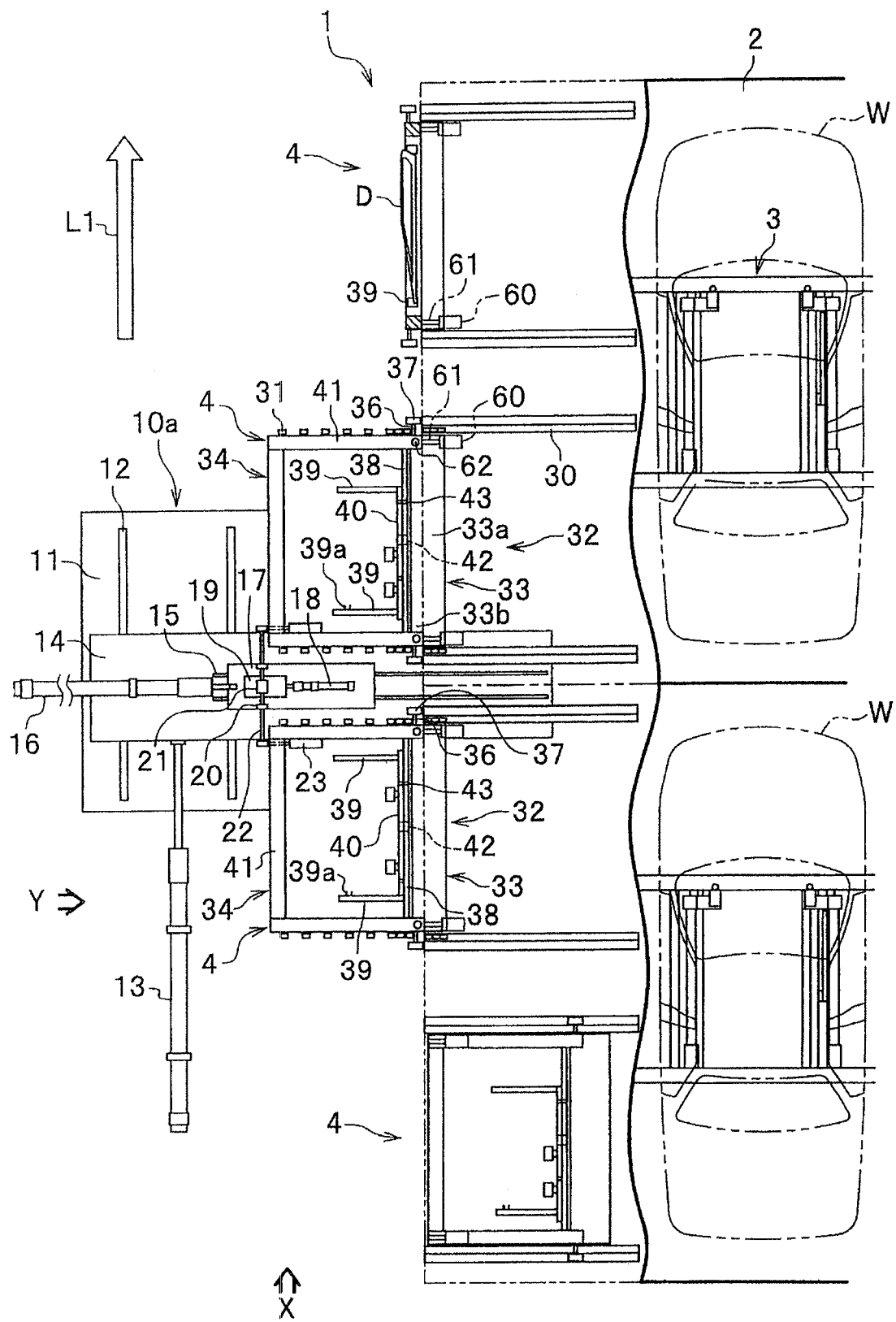
FIG. 2 is a plan view of the periphery of a door-holder putting-out mechanism.
Figure 3:
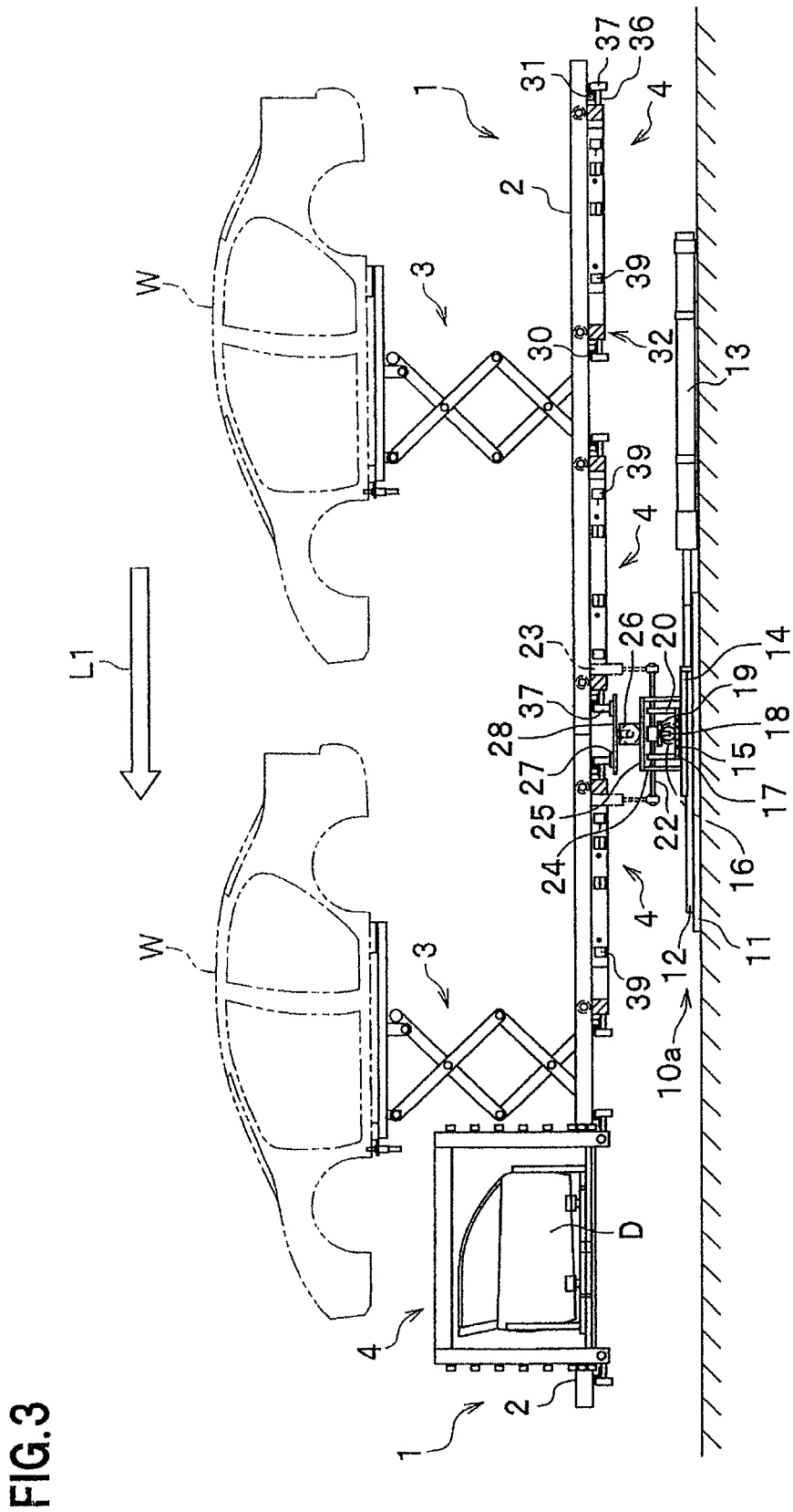
FIG. 3 is a view, from the Y direction indicated by an arrow, of the construction of FIG. 2.
Figure 4:
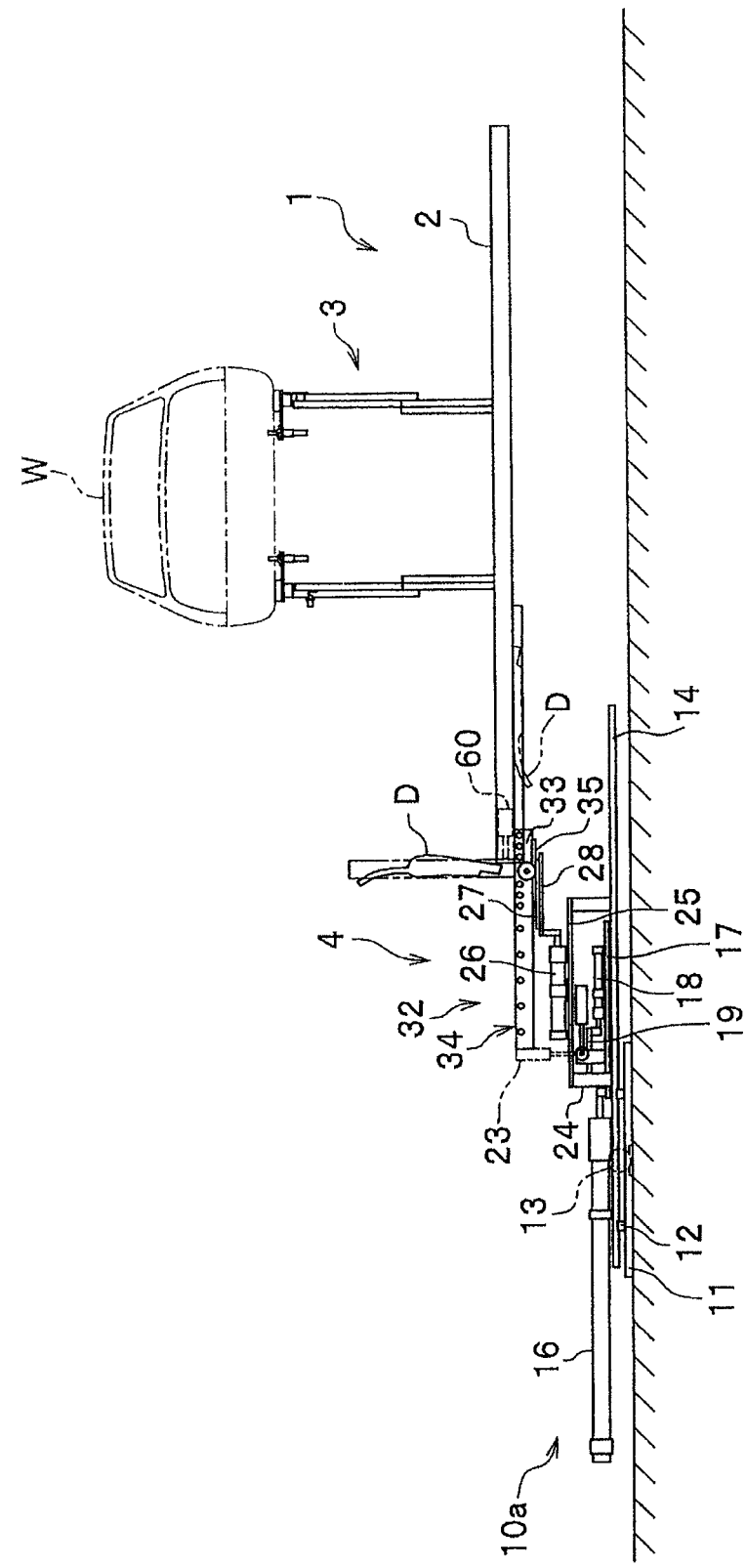
FIG. 4 is a view, from the X direction indicated by an arrow, of the construction of FIG. 2.
Figure 5:
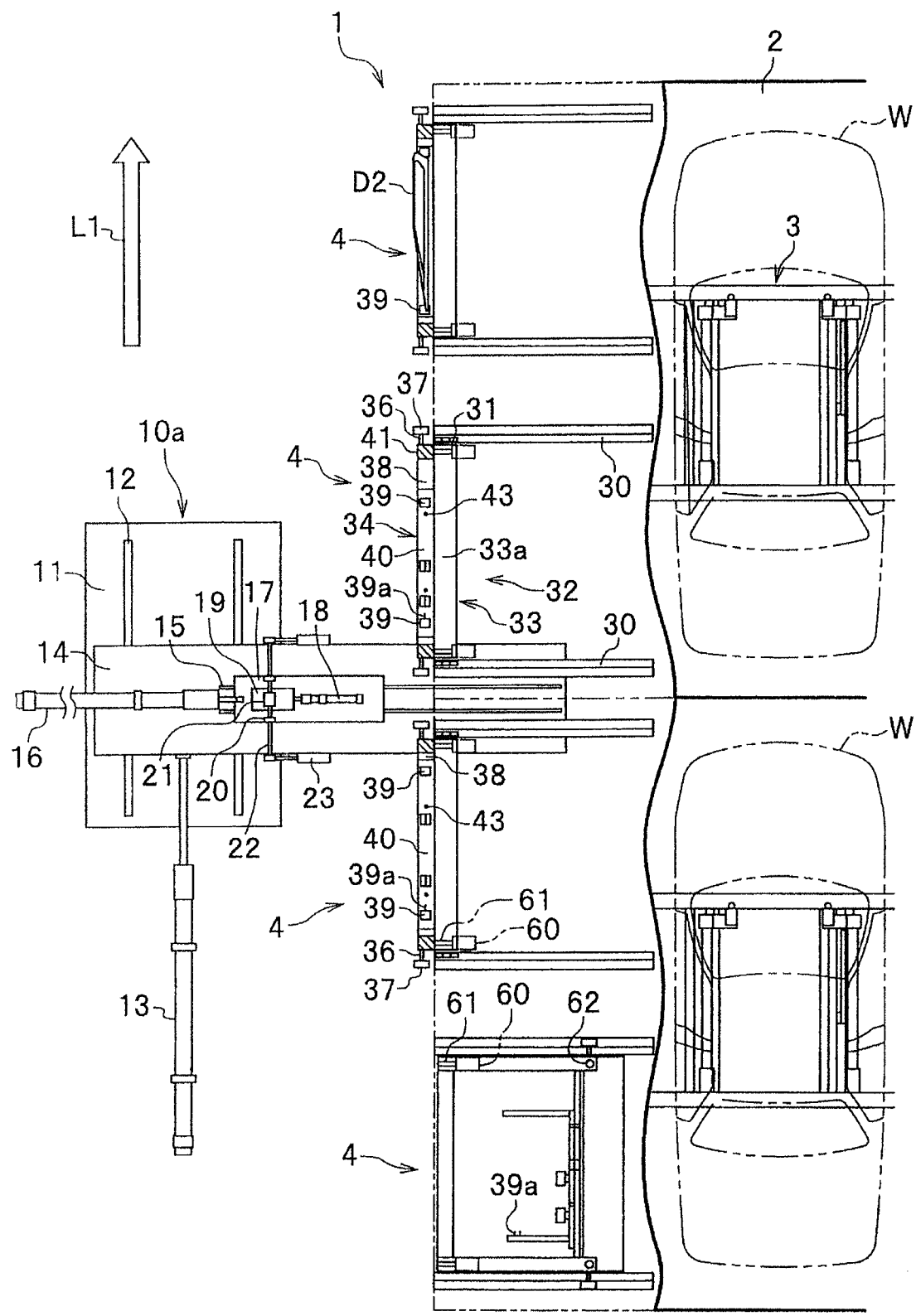
FIG. 5 is a plan view of the door-holder putting-out mechanism presented for explaining operations.
Figure 6:
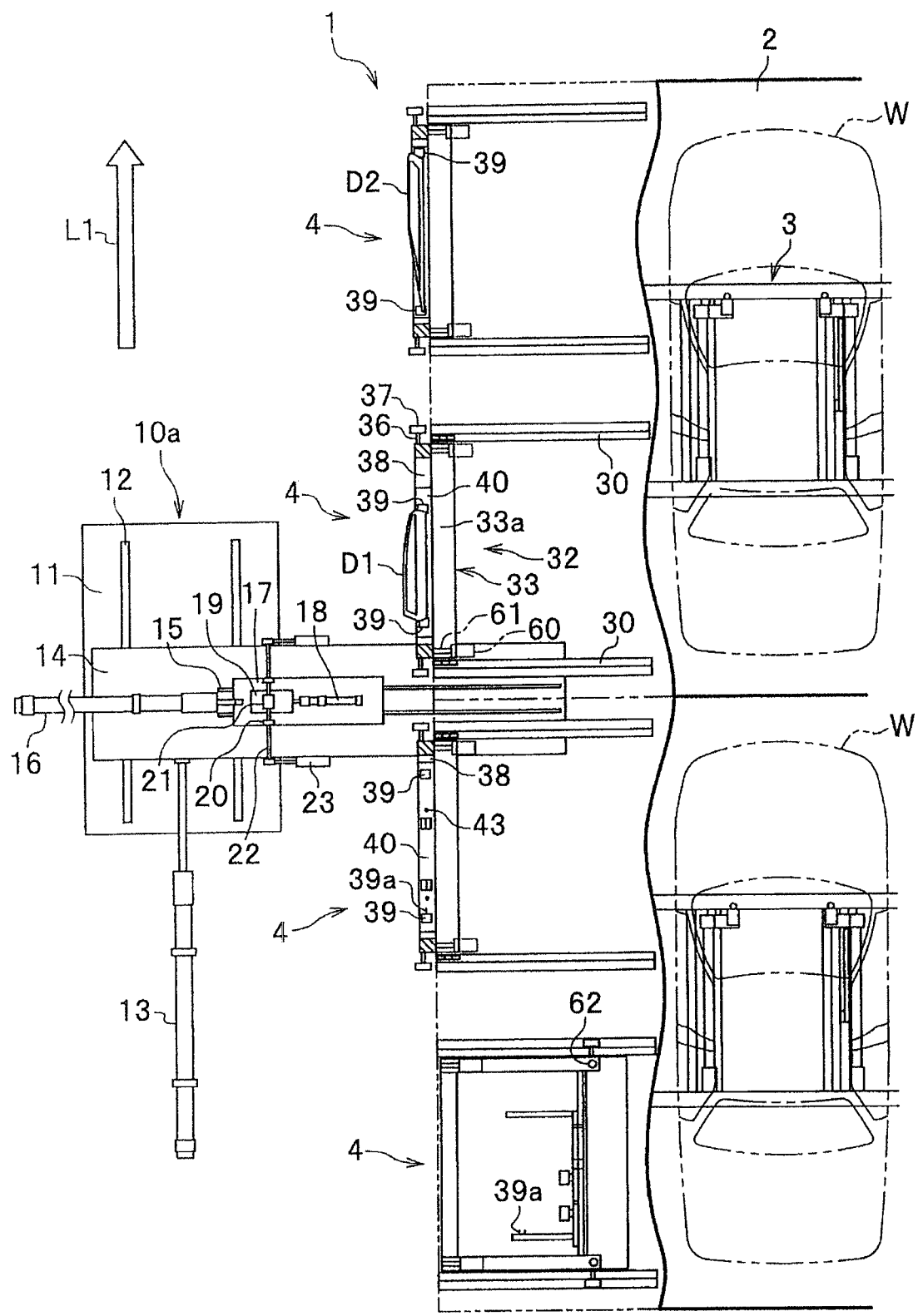
FIG. 6 is a plan view of the door-holder putting-out mechanism presented for explaining operations.
Figure 7:
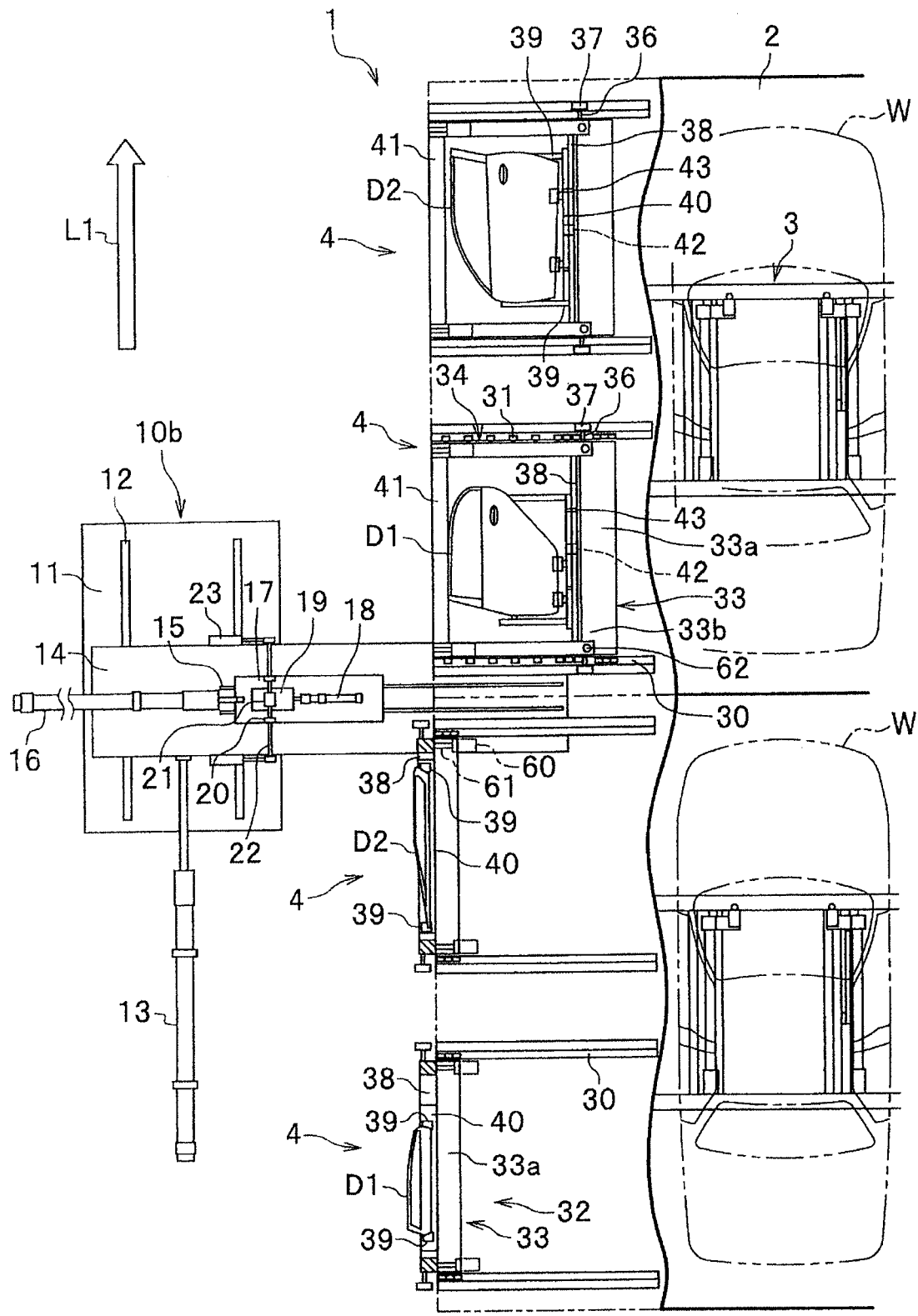
FIG. 7 is a plan view of a door-holder putting-in mechanism presented for explaining operations.
Figure 8:
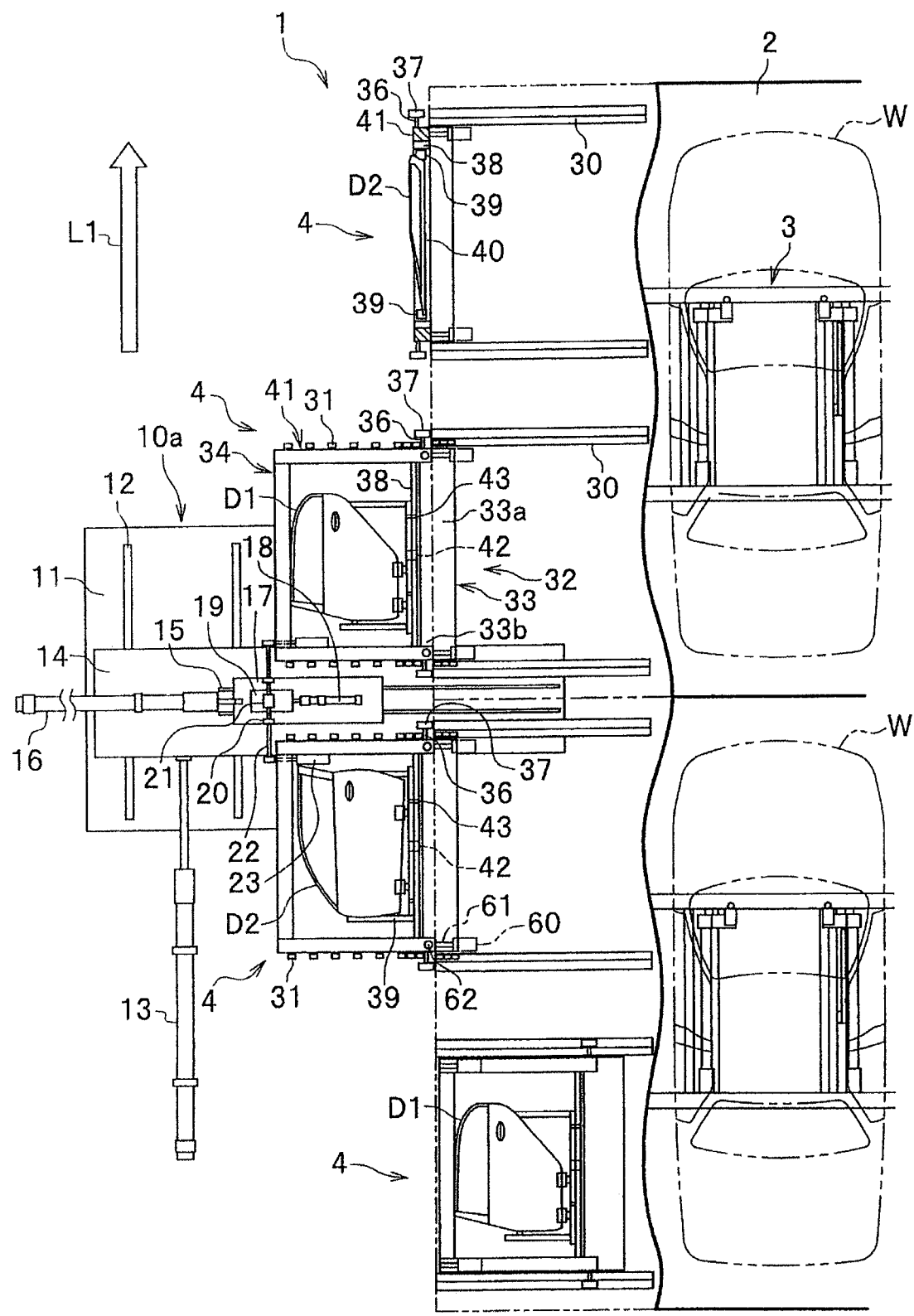
FIG. 8 is a plan view of the door-holder putting-out mechanism presented for explaining operations.
Figure 9:
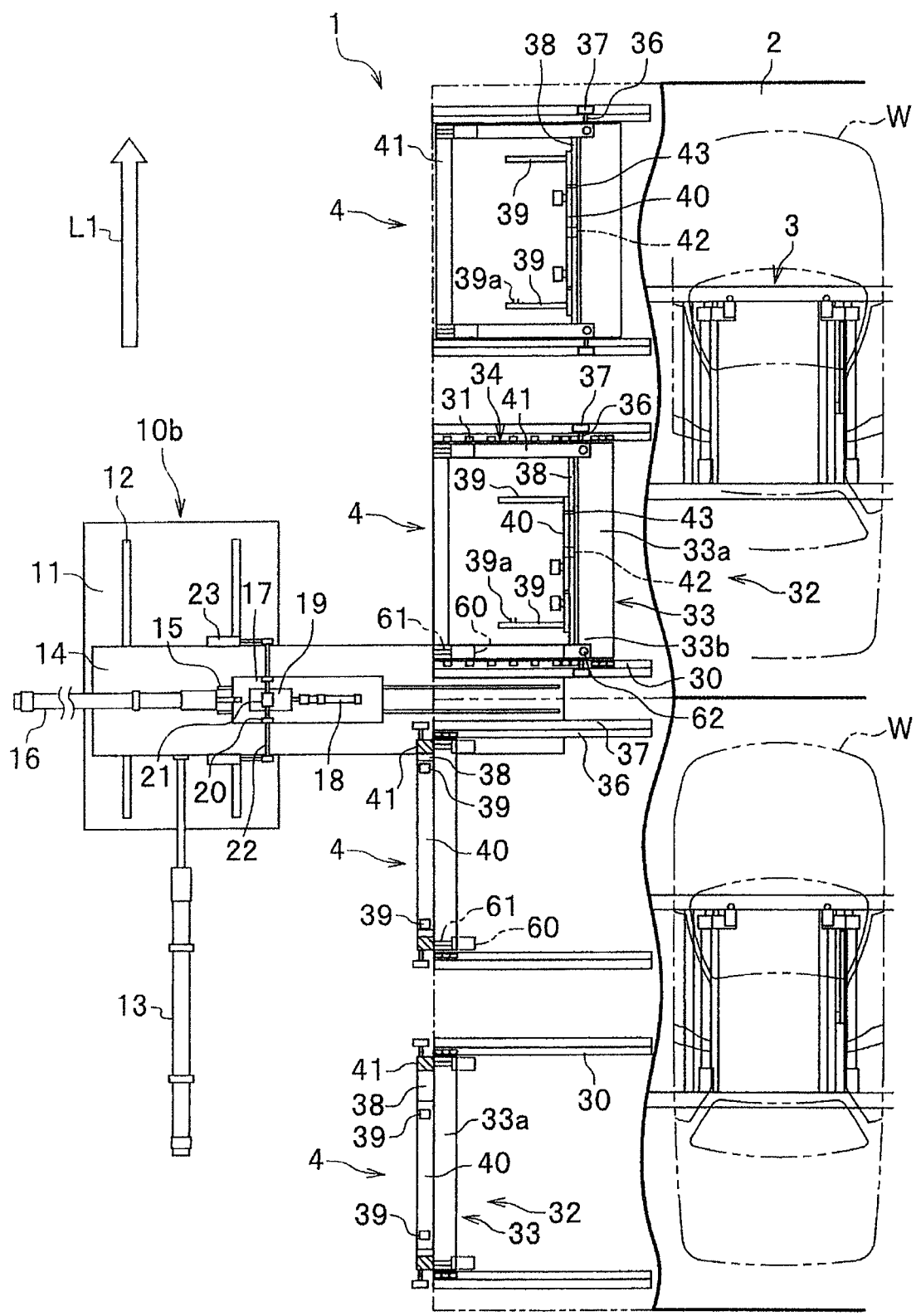
FIG. 9 is a plan view of the door-holder putting-in mechanism presented for explaining operations.

FIG. 2 is a plan view of the periphery of the door-holder putting-out mechanisms, FIG. 3 is a view, from the Y direction indicated by an arrow, of the construction of FIG. 2, and FIG. 4 is a view, from the X direction indicated by an arrow, of the construction of FIG. 2.

As illustrated in FIG. 2, the door-holder putting-out mechanism 10*a* includes a first base 11, first guide rails 12 arranged on the first base 11 in parallel with the vehicle-body conveying direction L1, a second base 14 which is slidable by a linear cylinder 13 along the first guide rails 12, second guide rails 15 arranged on the second base 14 in a direction perpendicular to the vehicle-body conveying direction L1, a third base 17 which is slidable by a first driving cylinder 16 along the second guide rails 15, a second driving cylinder 18 arranged on the third base 17, a rack gear 19 which is connected to a rod of the second driving cylinder 18 and is movable perpendicular to the vehicle-body conveying direction L1, a support shaft 22 pivotally supported by a pair of support plates 20 arranged on the third base 17, a pinion gear 21 arranged on the support shaft 22 and engaged with the rack gear 19, and pressing members 23 arranged at both ends of the support shaft 22.

The pressing members 23 arranged in the door-holder putting-out mechanism 10a are normally horizontally held on the base 2 side with respect to the support shaft 22, and pressing members 23 arranged in the door-holder putting-in mechanism 10b are normally horizontally held on the side opposite to the base 2 with respect to the support shaft 22.

In addition, as illustrated in FIGS. 3 and 4, the door-holder putting-out mechanism 10a further includes a fourth base 25, a third driving cylinder 26, and a support plate 28. The fourth base 25 is arranged on the second base 14 and supported by support plates 24 at four positions in such a manner that the fourth base 25 interferes with neither the third base 17 slid by the first driving cylinder 16 along the second guide rails 15 nor the support shaft 22, which moves with the third base 17. The third driving cylinder 26 is arranged on the fourth base 25. The support plate 28 is mounted to the third driving cylinder 26, and supports a pair of rack gears 27, which move perpendicular to the vehicle-body conveying direction L1. For simple illustration, the support plates 24, the fourth base 25, the third driving cylinder 26, the pair of rack gears 27, and the support plate 28 are not shown in FIG. 2 (and FIGS. 5 to 9).

Next, the door holders 4 are explained in detail below with reference to FIGS. 2 to 4.

The door holders 4 are fixed to the underside of the base 2 of the conveyor pallet 1. As mentioned before, two door holders 4, one on the front side and the other on the rear side, are arranged on each of the left and right sides of the conveyor pallet 1, i.e., the four door holders 4 in total are arranged on both sides. (See FIG. 1.)

As illustrated in FIG. 2, a pair of guide rails 30 are arranged on the underside of the base 2 perpendicular to the vehicle-body conveying direction L1. The door holders 4 each have a rectangular door-support frame 32, and rotatable rollers 31 engaged with the guide rails 30 are arranged along each of the sides of the door-support frame 32, where the sides are opposed in the vehicle-body conveying direction L1.

The door-support frame 32 has a support part 33 and a rotation part 34. The support part 33 is constituted by a base part 33a and an engaging part 33b. A rotatable shaft 36, which is fixed to the base ends of a U-shaped frame 41 constituting the rotation part 34, is rotatably engaged with the engaging part 33b. The U-shaped frame 41 is located outside of the engaging part 33b in the direction perpendicular to the vehicle-body conveying direction L1.

Each door holder 4 is formed in such a manner that both side faces of the rotation part 34 are flush with both side faces of the base part 33a of the support part 33 when the rotation part 34 is in a horizontal position. A support plate 35 extends forward from the underside of the support part 33, and supports the rotation part 34. (See FIG. 4 for the support plate 35.)

Pinion gears 37 are fixed to the ends of the rotatable shaft 36, and are engaged with the rack gears 27, so that the rotation part 34 is rotatable to a horizontal position or to a vertical position (with respect to the horizontal position) through the pinion gears 37 when the rack gears 27 are moved. (See FIGS. 3 and 4.) In addition, cylinders 60 are embedded in both side ends of the base 2 of the conveyor pallet 1. The rods 61 of the cylinders 60 are arranged to be capable of being inserted into engagement holes 62, which are opened in the U-shaped frame 41 in the rotation part 34 in each door holder 4.

A support plate 38 is arranged in the vicinities of the base ends of the U-shaped frame 41 in the rotation part 34. A door engagement part 40 having door-supporting rods 39 at both ends of the door engagement part 40 is rotatably supported by a rotatable shaft 42 on the support plate 38. The door engagement part 40 are normally received in the U-shaped frame 41 by inserting securing pins 43 into engagement holes opened in the support plate 38 and the door engagement part 40, and engaging the securing pins 43 with the support plate 38 and the door engagement part 40. The shape and dimensions of the door engagement part 40 may be changed according to the type (e.g., front or rear, car model, etc.) of the doors D.

Next, operations of the door-holder in/out mechanisms 10 and the door holders 4 in the vehicle-body assembly line L of FIG. 1 are explained in detail below with reference to FIGS. 2 to 9. In the vehicle-body assembly line L of FIG. 1, the door-holder in/out mechanisms 10 and the door holders 4 operate in the order: FIG. 2→FIG. 5→FIG. 6→FIG. 7→FIG. 8→FIG. 9.

When the conveyor pallet 1 is conveyed to a vicinity of the vehicle-body-door removal stage F as illustrated in FIG. 1, the linear cylinder 13 in the door-holder putting-out mechanisms 10a operates, so that the movement of the second base 14 synchronizes with the conveyor pallet 1.

In the above situation, the first driving cylinder 16 extends, and allows the third base 17 to move to the extension limit. When the second driving cylinder 18 is allowed to operate in this situation, the rack gear 19 horizontally moves, and the pinion gear 21 engaged with the rack gear 19 rotates. Therefore, the positions of the pressing members 23 arranged at both ends of the support shaft 22 are changed from horizontal positions to vertical positions, so that the pressing members 23 are erected in the U-shaped frame 41 of the rotation part 34 in each door holder 4 and engaged with the door holder 4. (See FIG. 3.) When the first driving cylinder 16 retracts in the above situation, the door holder 4 is laterally drawn out of the base 2 in the conveyor pallet 1. (See FIG. 2.)

Subsequently, the third driving cylinder 26 (as illustrated in FIGS. 3 and 4) operates, so that the rack gears 27 horizontally move. At this time, the pinion gears 37 engaged with the rack gears 27 rotate, so that the rotational position of the rotation part 34 in each door holder 4 is changed from a horizontal position to a vertical position. At the same time, the rods 61 of the cylinders 60 enter the engagement holes 62 in the rotation part 34, so that the door holder 4 is maintained in the vertical position. (See FIG. 5.)

In addition, at the same time, the second driving cylinder 18 operates, so that the pinion gear 21 rotates through the rack gear 19. Therefore, the positions of the pressing members 23 return from the vertical positions to the horizontal positions, and the engagement with the door holder 4 is released. Then, the linear cylinder 13 operates, so that the second base 14 returns to the original position.

Further, on the conveyor pallet 1, workers remove each door D from the vehicle body W, and fasten the door D with bolts between the pair of door-supporting rods 39 formed on the door engagement part 40 in the erected rotation part 34, for example, by inserting a pin 39a formed on one of the door-supporting rods 39 into a hinge hole (not shown) in the door D and fastening bolts by use of a door striker hole in the door D and a fastening hole (not shown) formed on the other of the door-supporting rods 39.

At this time, each door D is supported between the pair of door-supporting rods 39 in such a manner that the inner sides of the doors D on the left and right sides face each other. After that, workers release the engagement between the support plate 38 and the door engagement part 40 by pulling out the securing pins 43 from the engagement holes opened in the support plate 38 and the door engagement part 40. Subsequently, the workers rotate the U-shaped frame 41 180 degrees around the rotatable shaft 42 so that the doors D rotate to the positions in which the outer sides of the doors D on the left and right sides face each other. Then, the workers insert again the securing pins 43 into the engagement holes opened in the support plate 38 and the door engagement part 40, so as to bring the support plate 38 and the door engagement part 40 into an engaged state.

Thereafter, when the conveyor pallet 1 is conveyed to a vicinity of the door-holder putting-in mechanisms 10b which are arranged adjacent to the door-holder putting-out mechanisms 10a on the downstream side as illustrated in FIG. 1, the linear cylinder 13 operates in a similar manner to the aforementioned operation of the door-holder putting-out mechanisms 10a, so that the movement of the second base 14 synchronizes with the conveyor pallet 1.

In the above situation, the rods 61 of the cylinders 60 are pulled out of the engagement holes 62 in the rotation part 34 of each door holder 4. Then, the third driving cylinder 26 operates, so that the rack gears 27 horizontally move, and the pinion gears 37 engaged with the rack gears 27 rotate. Thus, the rotational position of the rotation part 34 in each door holder 4 is changed from a vertical position to a horizontal position.

At this time, the first driving cylinder 16 is in a retracted state, and the third base 17 is at a retraction limit. When the second driving cylinder 18 is allowed to operate in the above situation, the rack gear 19 horizontally moves, and the pinion gear 21 engaged with the rack gear 19 rotates. Therefore, the positions of the pressing members 23 arranged at both ends of the support shaft 22 are changed from horizontal positions to vertical positions, so that the pressing members 23 are erected outside the U-shaped frame 41 of the rotation part 34 in each door holder 4. When the first driving cylinder 16 extends in the above situation, the door holder 4 is laterally pushed to the inside of the base 2, so that the door holder 4 comes to be received in the conveyor pallet 1. (See FIG. 7.)

In addition, at the same time, the second driving cylinder 18 operates, so that the pinion gear 21 rotates through the rack gear 19. Therefore, the positions of the pressing members 23 return from the vertical positions to the horizontal positions, and the engagement with the door holder 4 is released. Then, the linear cylinder 13 operates, so that the second base 14 returns to the original position.

When the conveyor pallet 1 reaches the vicinity of the door-holder putting-out stage M1 as illustrated in FIG. 1, the door holders 4 are drawn out of the conveyor pallet 1 by the door-holder putting-out mechanisms 10a as mentioned before, and are thereafter erected. (See FIG. 8.) At this time, the doors D come to a state in which the outer sides of the doors D face each other. That is, the inner sides of the doors D are turned outward. Therefore, assembly of components to the doors D is facilitated. Subsequently, the assembly of components to the doors D is started from the first stages B1 in the door-component assembly lines B.

Thereafter, the doors D to which the assembly of components is completed in the final stages B2 in the door-component assembly lines B as illustrated in FIG. 1 reach the vehicle-body-door mounting stage G workers release the engagement of the support plate 38 and the door engagement part 40 by pulling out the securing pins 43 from the engagement holes opened in the support plate 38 and the door engagement part 40. Subsequently, the workers rotate the U-shaped frame 41 180 degrees around the rotatable shaft 42 so that the doors D rotate to the positions in which the inner sides of the doors D on the left and right sides face each other. Then, the workers insert again the securing pins 43 into the engagement holes opened in the support plate 38 and the door engagement part 40, so as to bring the support plate 38 and the door engagement part 40 into an engaged state.

Subsequently, the workers remove the bolts which are fastened by use of the door striker hole in each door D and the fastening hole (not shown) formed in the door-supporting rod 39. Further, the workers release the engagement of the hinge hole in the door D and the pin 39a (formed on the door-supporting rods 39). Then, the workers remove the door D from between the pair of door-supporting rods 39, and assemble the removed door D to the vehicle body W.

After that, when the conveyor pallet 1 reaches a vicinity of the door-holder putting-in mechanisms 10b arranged on the downstream side of the vehicle-body-door mounting stage G, the linear cylinder 13 operates as mentioned before, so that the movement of the second base 14 synchronizes with the conveyor pallet 1.

Then, the rods 61 of the cylinders 60 are pulled out of the engagement holes 62 in the rotation part 34 of each door holder 4. Then, the third driving cylinder 26 operates, so that the rack gears 27 horizontally move, and the pinion gears 37 engaged with the rack gears 27 rotate. Thus, the rotational position of the rotation part 34 in each door holder 4 is changed from a vertical position to a horizontal position.

At this time, the first driving cylinder 16 is in a retracted state, and the third base 17 is at the retraction limit. When the second driving cylinder 18 is allowed to operate in the above situation, the rack gear 19 horizontally moves, and the pinion gear 21 engaged with the rack gear 19 rotates. Therefore, the positions of the pressing members 23 arranged at both ends of the support shaft 22 are changed from horizontal positions to vertical positions, so that the pressing members 23 are erected outside the U-shaped frame 41 of the rotation part 34 in each door holder 4. When the first driving cylinder 16 extends in the above situation, the door holder 4 is laterally pushed to the inside of the base 2, so that the door holder 4 comes to be received in the conveyor pallet 1. (See FIG. 9.)

In addition, at the same time, the second driving cylinder 18 operates, so that the pinion gear 21 rotates through the rack gear 19. Therefore, the positions of the pressing members 23 return from the vertical positions to the horizontal positions, and the engagement with the door holder 4 is released. Then, the linear cylinder 13 operates, so that the second base 14 returns to the original position.

Thereafter, the vehicle body W to which the assembly is completed is released toward a completed-vehicle inspection line on the downstream side, by using transfer equipment (not shown) from the lift mechanism 3, or by lowering the lift mechanism 3, bringing tires (which are put on the vehicle body W) into contact with the base 2 of the conveyor pallet 1, and making the vehicle run by itself. The conveyor pallet 1 from which the vehicle body W is released is transported to the initial stage in the vehicle-body assembly line L through a return path (not shown) in the vehicle-body assembly line L.

As explained above, according to the first embodiment, the doors D are removed from the vehicle body W, and mounted to the door holders 4 which are put laterally outside the base 2. Components are assembled to the doors D while the conveyor pallet 1 is conveyed downstream with the door holders 4 kept put outside the base 2 in the lateral directions and holding the doors D. Thereafter, the doors D to which components are assembled are detached from the door holders 4, and assembled to the vehicle body W.

According to the first embodiment as above, the conveyor system for conveying doors to the door-component assembly line, which is conventionally necessary, is unnecessary. In addition, it is unnecessary to separately build a door-component assembly line.

Therefore, the first embodiment provides a vehicle-body assembly line which enables cost reduction, space saving, and return of doors to a vehicle body after removal of the doors from the vehicle body and assembly of components to the doors.

In addition, the vehicle-body assembly line L according to the first embodiment includes, between the vehicle-body-door removal stage F and the door-component assembly lines B, the door-holder putting-in stage N1, the door-holder reception keeping stage H1 arranged to follow the door-holder putting-in stage N1, and the door-holder putting-out stage M1 arranged to follow the door-holder reception keeping stage H1. In the door-holder putting-in stage N1, the door holders 4 holding the doors D are put laterally inside the base 2 after the operation in the vehicle-body-door removal stage F. In the door-holder reception keeping stage H1, the door holders 4 holding the doors D are kept put inside the base 2 in the lateral directions. In the door-holder putting-out stage M1, the door holders 4 holding the doors D are put laterally outside the base 2.

Since the vehicle-body assembly line L has the above configuration, which is capable of coping with the case where the final stages B2 in the door-component assembly lines B and the vehicle-body-door mounting stage G in the vehicle-body assembly line L are sequentially arranged. Therefore, the doors D is enabled to be assembled to the vehicle body W immediately after completion of the assembly of components to the doors D.

That is, the above case is capable of coping with, for example, a vehicle-body assembly method in which large components such as an instrument panel or a roof lining are assembled to the vehicle body in an upstream area in the vehicle-body assembly line L, before the door-component assembly step B, by robots arranged on one side of the vehicle-body assembly line L while the doors D removed from the vehicle body are received in the conveyor pallet 1.

In addition, according to the first embodiment, the door-component assembly line B includes door-holder in/out mechanisms 10 arranged on both sides of the vehicle-body assembly line L (which are opposed in the direction perpendicular to the vehicle-body conveying direction L1 in the vehicle-body assembly line L) for putting the door holders 4 laterally inside or outside the base 2.

In the above construction, it is possible to automatically put the door holders 4 laterally inside or outside the base 2 when the conveyor pallet 1 reaches the positions at which the door-holder in/out mechanisms 10 are arranged. In addition, it is sufficient to arrange the door-holder in/out mechanisms 10 in only necessary positions, and it is unnecessary to arrange a door-holder in/out mechanism for every door holder 4.

Further, according to the first embodiment, the door holders 4 hold the doors D in horizontal positions when the door holders hold the doors D with the door holders put inside the base 2 in the lateral directions, and hold the doors D in upright positions when the door holders hold the doors D with the door holders put outside the base 2 in the lateral directions.

In the above construction, the doors are put laterally inside the base and held in the horizontal positions when the doors are held without assembly of components to the doors. Therefore, the doors are compactly stored without interference with operations on the vehicle body such as assembly of components to the vehicle body. On the other hand, the doors are put laterally outside the base and held in the vertical positions when the doors are held for assembly of components to the doors. That is, the doors are held in positions suitable for the operation for assembly of components to the doors.

Second Embodiment

Figure 10:
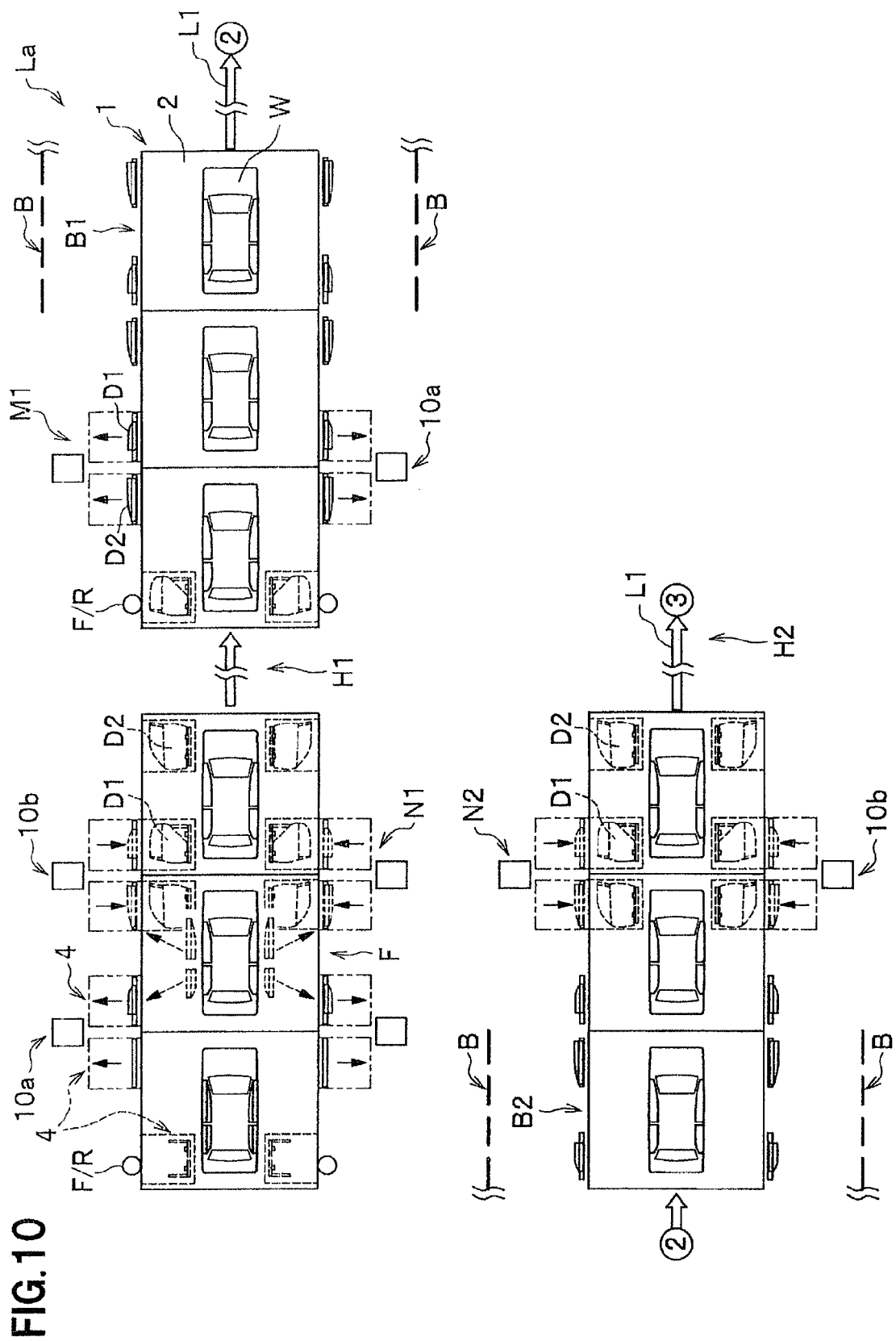
FIG. 10 is a diagram indicating a layout of a vehicle-body assembly line according to a second embodiment of the present invention.
Figure 11:
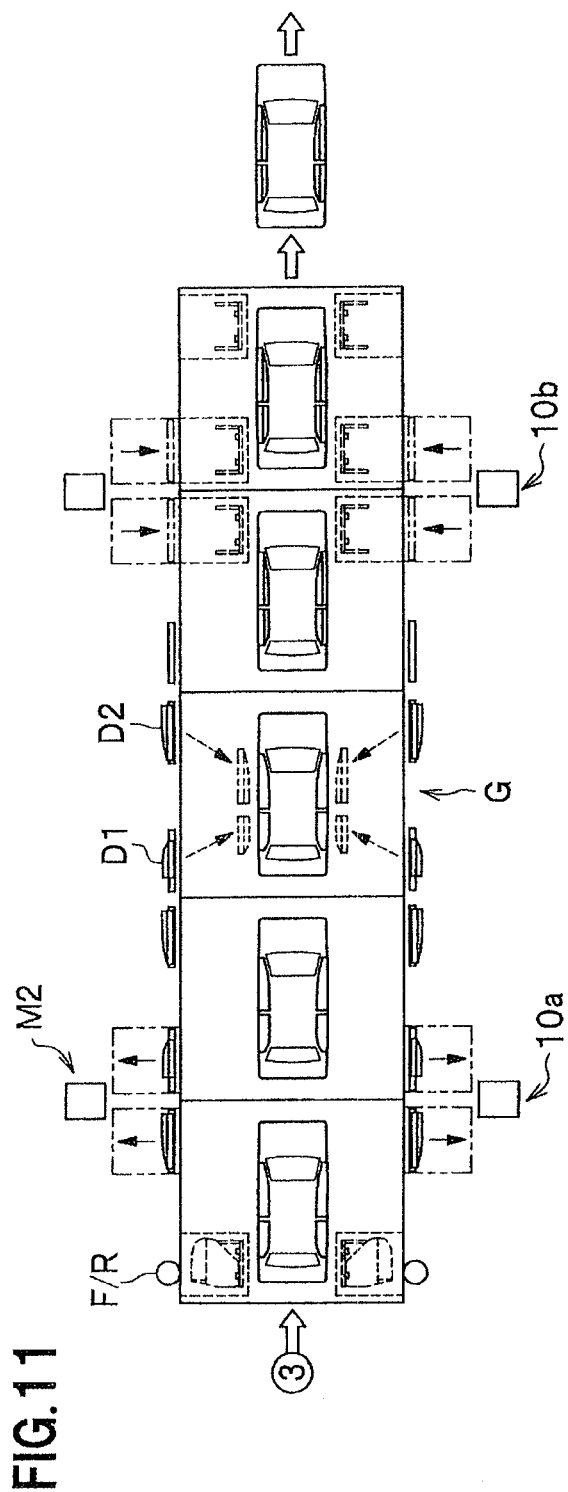
FIG. 11 is a diagram following FIG. 10 and indicating a part of the layout of the vehicle-body assembly line according to the second embodiment of the present invention.

FIGS. 10 and 11 are diagrams indicating a layout of a vehicle-body assembly line La according to the second embodiment of the present invention. The following explanations on the second embodiment are mainly focused on the differences from the first embodiment, and the explanations on the first embodiment are applied to the second embodiment for the features which are common to the first and second embodiments.

According to the first embodiment (illustrated in FIG. 1), the final stages B2 of the door-component assembly lines B and the vehicle-body-door mounting stage G in the vehicle-body assembly line L are sequentially arranged, and doors D are assembled to the vehicle body W immediately after completion of assembly of components to the doors D.

On the other hand, the second embodiment (illustrated in FIGS. 10 and 11) is provided for the case where the process layout does not allow sequential arrangement of the final stages B2 of the door-component assembly lines B and the vehicle-body-door mounting stage G in the vehicle-body assembly line La. In this case, the door-holder putting-in mechanisms 10b allow the door holders 4 holding the doors D to which the assembly of components is completed to be received in the conveyor pallet 1 again. Thereafter, the door-holder putting-out mechanisms 10a bring the door holders 4 into upright positions immediately before the vehicle-body-door mounting stage G in the vehicle-body assembly line La, and then the doors D are mounted to the vehicle body W in the vehicle-body-door mounting stage G.

In the vehicle-body assembly line La according to the second embodiment, the door-holder in/out mechanisms 10 and the door holders 4 operate in the order: FIG. 2→FIG. 5→FIG. 6→FIG. 7→FIG. 8→FIG. 7→FIG. 8→FIG. 9.

That is, the vehicle-body assembly line La according to the second embodiment further includes, between the door-component assembly lines B and the vehicle-body-door mounting stage G in the vehicle-body assembly line L according to the first embodiment, a second door-holder putting-in stage N2 arranged to follow the door-component assembly lines B, a second door-holder reception keeping stage H2 arranged to follow the second door-holder putting-in stage N2, and a second door-holder putting-out stage M2 arranged to follow the second door-holder reception keeping stage H2. In the second door-holder putting-in stage N2, the door holders 4 holding the doors D are put laterally inside the base 2. In the second door-holder reception keeping stage H2, the door holders 4 are kept put inside the base 2 in lateral directions. In the second door-holder putting-out stage M2, the door holders 4 holding the doors D are put laterally outside the base 2. In the second door-holder reception keeping stage H2, components are assembled to the vehicle body W with the doors D removed from the vehicle body W received in the conveyor pallet 1.

The second embodiment as explained above is capable of coping with the case where the process layout does not allow sequential arrangement of the final stages B2 in the door-component assembly lines B and the vehicle-body-door mounting stage G in the vehicle-body assembly line La.

That is, the above case is capable of coping with, for example, a vehicle-body assembly method in which components are assembled to the vehicle body W before and after the door-component assembly lines B with the doors D removed from the vehicle body W received in the conveyor pallet 1.

Third Embodiment

Figure 12:
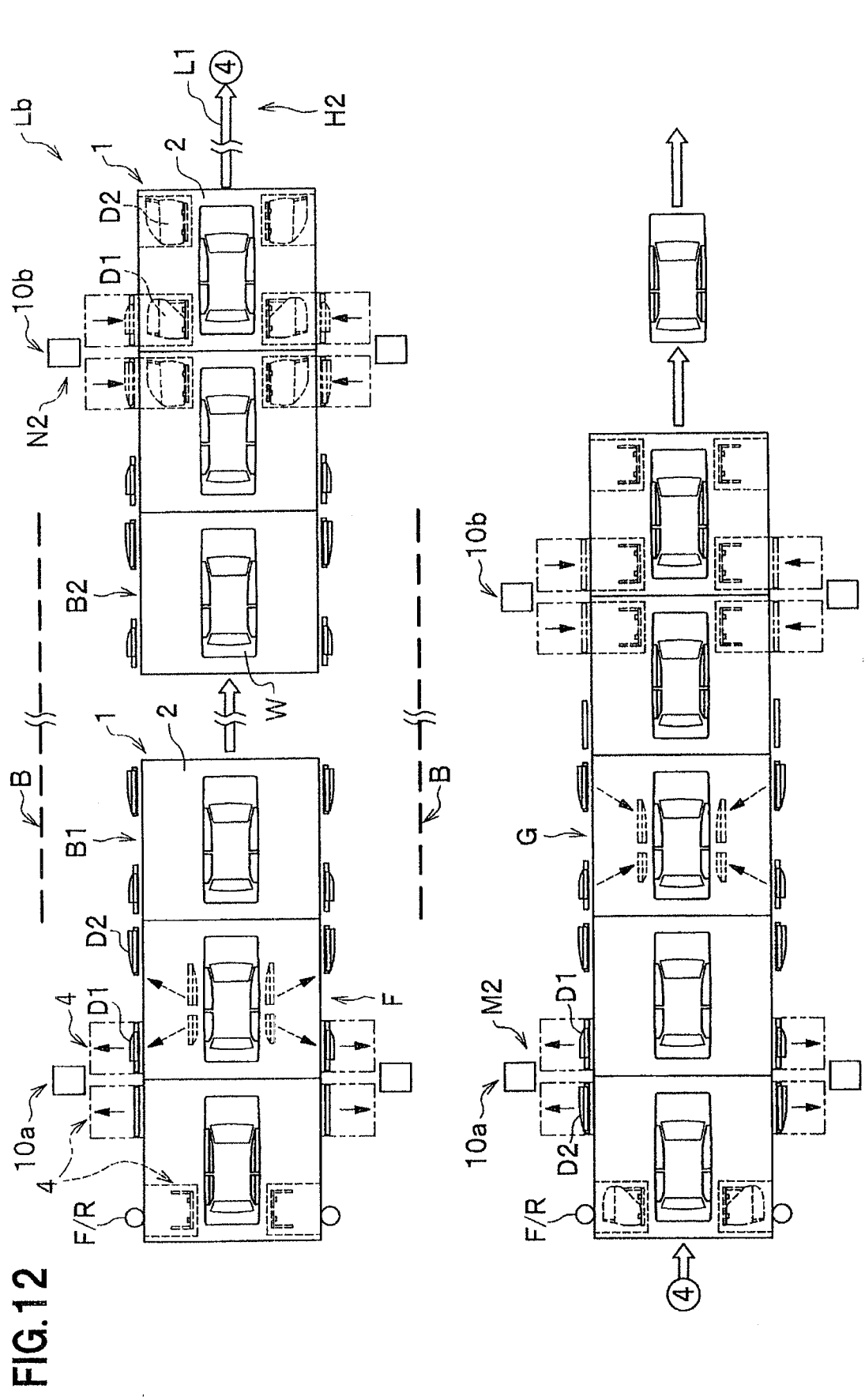
FIG. 12 is a diagram indicating a layout of a vehicle-body assembly line according to a third embodiment of the present invention.

FIG. 12 is a diagram indicating a layout of a vehicle-body assembly line Lb according to the third embodiment of the present invention. The following explanations on the third embodiment are mainly focused on the differences from the embodiments explained before, and the explanations on the first and second embodiments are applied to the third embodiment for the features which are common to the third embodiment and the first or second embodiment.

According to the first embodiment (illustrated in FIG. 1), the doors D removed from the vehicle body W in the initial stage in the vehicle-body assembly line L are held in the door holders 4 which are in upright positions. Subsequently, the door-holder putting-in mechanisms 10b allow the door holders 4 holding the doors D to be received in the conveyor pallet 1, and then the conveyor pallet 1 is conveyed. Thereafter, the door-holder putting-out mechanisms 10a arranged immediately before the initial stages B1 in the door-component assembly lines B draw the door holders 4 holding the doors D out of the conveyor pallet 1 and bring the door holders 4 into upright positions again. Then, components are assembled to the doors D.

On the other hand, according to the third embodiment (illustrated in FIG. 12), the doors D removed from the vehicle body W in the initial stage in the vehicle-body assembly line Lb are held in the door holders 4 which are in upright positions. From then on, the upright positions of the door holders 4 are maintained, so that the door-component assembly lines B are formed and components are assembled to the doors D in upright positions. Thereafter, the door-holder putting-in mechanisms 10b arranged after completion of the final stages of the door-component assembly lines B allow the door holders 4 holding the doors D to which the assembly of the components is completed to be received in the conveyor pallet 1. After that, the door-holder putting-out mechanisms 10a bring the door holders 4 into upright positions immediately before the vehicle-body-door mounting stage G in the vehicle-body assembly line Lb, and then the doors D are mounted to the vehicle body W in the vehicle-body-door mounting stage G.

The third embodiment is also provided for the case where the process layout does not allow sequential arrangement of the final stages B2 of the door-component assembly lines B and the vehicle-body-door mounting stage G in the vehicle-body assembly line Lb.

In the vehicle-body assembly line Lb according to the third embodiment, the door-holder in/out mechanisms 10 and the door holders 4 operate in the order: FIG. 2→FIG. 5→FIG. 6→FIG. 7→FIG. 8→FIG. 9.

That is, the vehicle-body assembly line Lb according to the third embodiment does not include the door-holder putting-in stage N1 and the door-holder reception keeping stage H1 in the vehicle-body assembly line L according to the first embodiment. The vehicle-body assembly line Lb includes, between the door-component assembly lines B and the vehicle-body-door mounting stage G in the vehicle-body assembly line L according to the first embodiment, a second door-holder putting-in stage N2 arranged to follow the door-component assembly lines B, a second door-holder reception keeping stage H2 arranged to follow the second door-holder putting-in stage N2, and a second door-holder putting-out stage M2 arranged to follow the second door-holder reception keeping stage H2. In the second door-holder putting-in stage N2, the door holders 4 holding the doors D are put laterally inside the base 2. In the second door-holder reception keeping stage H2, the door holders 4 holding the doors D are kept put inside the base 2 in lateral directions. In the second door-holder putting-out stage M2, the door holders 4 holding the doors D are put laterally outside the base 2.

The third embodiment as explained above is capable of coping with the case where the process layout does not allow the final stages B2 in the door-component assembly lines B and the vehicle-body-door mounting stage G in the vehicle-body assembly line Lb.

That is, the above case is capable of coping with, for example, the case where large components such as tires, bumpers, seats, and a windshield are assembled to the vehicle body W in a downstream area in the vehicle-body assembly line Lb after the door-component assembly lines B by robots arranged on one side of the vehicle-body assembly line Lb with the doors D removed from the vehicle body W received in the conveyor pallet 1.

Fourth Embodiment

Figure 13:
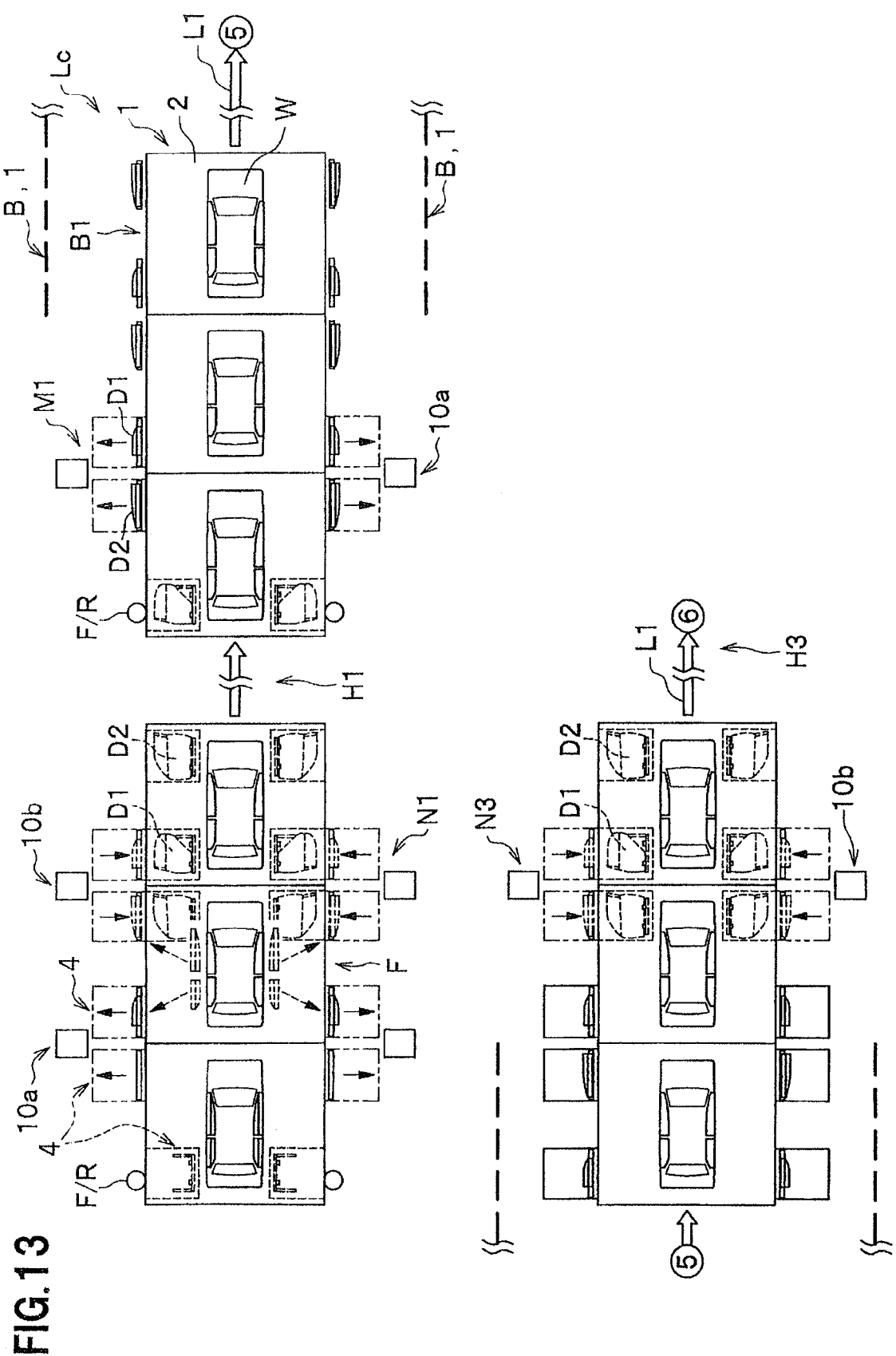
FIG. 13 is a diagram indicating a layout of a vehicle-body assembly line according to a fourth embodiment of the present invention.

FIGS. 13 and 14 are diagrams indicating a layout of a vehicle-body assembly line Lc according to the fourth embodiment of the present invention. The following explanations on the fourth embodiment are mainly focused on the differences from the embodiments explained before, and the explanations on the first to third embodiment are applied to the fourth embodiment for the features which are common to the fourth embodiment and at least one of the first to third embodiments.

The fourth embodiment (illustrated in FIGS. 13 and 14) is provided for the case where the process layout allows neither sequential arrangement of the door-component assembly lines B nor sequential arrangement of the final stages B2 of the door-component assembly lines B and the vehicle-body-door mounting stage G in the vehicle-body assembly line Lc.

In the above case, the doors D removed from the vehicle body W in the initial stage in the vehicle-body assembly line Lc are held in the door holders 4 which are in upright positions. Subsequently, the door-holder putting-in mechanisms 10b allow the door holders 4 holding the doors D to be received in the conveyor pallet 1, and then the conveyor pallet 1 is conveyed. Thereafter, the door-holder putting-out mechanisms 10a arranged immediately before the initial stages B1 in the door-component assembly lines B draw the door holders 4 holding the doors D out of the conveyor pallet 1 and bring the door holders 4 into upright positions. (The first door-component assembly lines B,1 and the second door-component assembly lines B,2 are collectively referred to as the door-component assembly lines B.) Then, components are assembled to the doors D.

Thereafter, the door-holder putting-in mechanisms 10b arranged midway through the door-component assembly lines B allow the door holders 4 to be received in the conveyor pallet 1. At this time, the door holders 4 hold the doors to which components are partially assembled. Then, the conveyor pallet 1 is conveyed. After that, the door-holder putting-out mechanisms 10a arranged on the downstream side draw the door holders 4 holding the doors D out of the conveyor pallet 1 and bring the door holders 4 into upright positions again. Then, components are assembled to the doors D.

After the above operations, the door-holder putting-in mechanisms 10b arranged on the downstream side of the final stages B2 in the door-component assembly lines B allow the door holders 4 to be received in the conveyor pallet 1. At this time, the door holders 4 hold the doors to which the assembly of the components is completed. Then, the conveyor pallet 1 is further conveyed downstream. After that, immediately before the vehicle-body-door mounting stage G in the vehicle-body assembly line Lc, the door-holder putting-out mechanisms 10a draw the door holders 4 holding the doors D out of the conveyor pallet 1 and bring the door holders 4 into upright positions again. Then, the doors D are mounted to the vehicle body W in the vehicle-body-door mounting stage G In the vehicle-body assembly line Lc according to the fourth embodiment, the door-holder in/out mechanisms 10 and the door holders 4 operate in the order: FIG. 2→FIG. 5→FIG. 6→FIG. 7→FIG. 8→FIG. 7→FIG. 8→FIG. 7→FIG. 8→FIG. 9.

That is, in the vehicle-body assembly line Lc according to the fourth embodiment, the door-component assembly lines B in the vehicle-body assembly line La according to the second embodiment are modified to be constituted by the first door-component assembly lines B,1 for assembling first components to the doors D and the second door-component assembly lines B,2 for assembling second components to the doors D. In addition, the vehicle-body assembly line Lc according to the fourth embodiment further includes, between the first door-component assembly lines B,1 and the second door-component assembly lines B,2, a third door-holder putting-in stage N3 arranged to follow the first door-component assembly lines B,1, a third door-holder reception keeping stage H3 arranged to follow the third door-holder putting-in stage N3, and a third door-holder putting-out stage M3 arranged to follow the third door-holder reception keeping stage H3. In the third door-holder putting-in stage N3, the door holders 4 holding the doors D are put laterally inside the base 2 after the operation in the vehicle-body-door removal stage F. In the third door-holder reception keeping stage H3, the door holders 4 holding the doors D are kept put inside the base 2 in lateral directions. In the third door-holder putting-out stage M3, the door holders 4 holding the doors D are put laterally outside the base 2. In the third door-holder reception keeping stage H3, components are assembled to the vehicle body W with the doors D removed from the vehicle body W are received in the conveyor pallet 1.

The fourth embodiment as explained above is capable of coping with the case where the case where the process layout allows neither sequential arrangement of the door-component assembly lines B nor sequential arrangement of the final stages B2 of the door-component assembly lines B and the vehicle-body-door mounting stage G in the vehicle-body assembly line Lc.

That is, in the above case, components are enabled to be assembled to the doors D in multiple operations. In addition, it is capable of coping with, for example, a vehicle-body assembly method in which in the middle of the assembly of components to the doors D, the doors D removed from the vehicle body W are put inside the conveyor pallet 1, and components are assembled to the vehicle body W with the doors D removed from the vehicle body W received in the carrier.

Although the present invention has been explained by using the embodiments, the present invention is not limited to the constructions recited in the embodiments, and it is possible to combine or select the constructions recited in the embodiments as needed, and modify the constructions recited in the embodiments within the scope of the present invention.

For example, in the explained embodiments, the door-holder in/out mechanisms 10 uses as an actuator a cylinder using pressure of fluid such as air. However, the present invention is not limited to the above actuator, and another actuator such as an electric motor may be used.

In addition, in the fourth embodiment, the case where the door-component assembly lines B are divided into two sets of lines which are separately arranged. However, the present invention is not limited to such door-component assembly lines B, and is applied to the cases where the door-component assembly lines B are divided into three or more sets of lines which are separately arranged.

What is claimed is:

1. A vehicle-body assembly line comprising:
   a carrier comprising: a base for placing a vehicle body; and a door holder fixed integrally to the base and being movable transversely between an inside of the base and an outside of the base for holding a door for the vehicle body, the carrier being conveyed downstream with the vehicle body placed on the base for mounting a vehicle component to the vehicle body during the conveying of the carrier;
   a vehicle-body-door removal stage for removing the door from the vehicle body to mount the door to the door holder that is disposed outside the base in a transverse direction;
   a door-component assembly line arranged on a downstream side of the vehicle-body-door removal stage for mounting a door component to the door that is held by the door holder fixed to the base while the carrier is being conveyed downstream with the door holder holding the door disposed outside the base in the transverse direction; and
   a vehicle-body-door mounting stage arranged on a downstream side of the door-component assembly line for removing from the door holder the door having the door component mounted thereto, and mounting the door to the vehicle body.

2. The vehicle-body assembly line according to claim 1, further comprising a door-holder in/out mechanism arranged on each of both sides of the vehicle-body assembly line in a direction perpendicular to a direction of conveying the vehicle body in the vehicle-body assembly line for putting the door holder transversely inside or outside the base,
   wherein the door-holder in/out mechanism comprises a driving cylinder to move the door holder transversely between the inside of the base and the outside of the base.

3. The vehicle-body assembly line according to claim 2, wherein the door-holder in/out mechanism comprises a door-holder putting-out mechanism for putting the door holder transversely outside the base; and a door-holder putting-in mechanism for putting the door holder transversely inside the base,
   wherein the door-holder putting-out mechanism comprises a driving cylinder to move the door holder transversely from the inside of the base to the outside of the base, and
   wherein the door-holder putting-in mechanism comprises a driving cylinder to move the door holder transversely from the outside of the base to the inside of the base.

4. The vehicle-body assembly line according to claim 1, wherein the door-component assembly line is divided into multiple lines which are separately arranged.

5. The vehicle-body assembly line according to claim 1, wherein the door holder holds the door in a horizontal position when the door holder holds the door with the door holder disposed inside the base in the transverse direction, and the door holder holds the door in an upright position when the door holder holds the door with the door holder disposed outside the base in the transverse direction.

6. A method for assembling a vehicle body, comprising:
- a step for providing a carrier comprising a base for placing a vehicle body and a door holder fixed integrally to the base and being movable transversely between an inside of the base and an outside of the base for holding a door for the vehicle body, the carrier being conveyed downstream with the vehicle body placed on the base for mounting a vehicle component to the vehicle body during the conveying of the carrier;
- a vehicle-body-door removal step for removing the door from the vehicle body, and mounting the door to the door holder that is disposed outside the base in a transverse direction;
- a door-component assembly step, executed after the vehicle-body-door removal step, for mounting a door component to the door that is held by the door holder fixed to the base while the carrier is being conveyed downstream with the door holder holding the door disposed outside the base in the transverse direction; and
- a vehicle-body-door mounting step, executed after the door-component assembly step, for removing from the door holder the door having the door component mounted thereto, and mounting the door to the vehicle body.

7. The method according to claim 6, wherein: the vehicle-body-door removal step is executed as an initial step in a vehicle-body assembly line; and the method further comprises, between the vehicle-body-door removal step and the door-component assembly step, a door-holder putting-in step, executed after the vehicle-body-door removal step, for putting the door holder holding the door transversely inside the base; a door-holder reception keeping step, executed after the door holder putting-in step, for keeping the door holder holding the door put transversely inside the base; and a door-holder putting-out step, executed after the door-holder reception keeping step, for putting the door holder holding the door transversely outside the base.

8. The method according to claim 6, wherein: the vehicle-body-door removal step is executed as an initial step in a vehicle-body assembly line; and the method further comprises, between the door-component assembly step and the vehicle-body-door mounting step, a second door-holder putting-in step, executed after the door-component assembly step, for putting the door holder holding the door transversely inside the base; a second door-holder reception keeping step, executed after the second door holder putting-in step, for keeping the door holder holding the door put transversely inside the base; and a second door-holder putting-out step, executed after the second door-holder reception keeping step, for putting the door holder holding the door transversely outside the base.

9. The method according to claim 6, wherein: the vehicle-body-door removal step is executed as an initial step in a vehicle-body assembly line; the door-component assembly step comprises a first door-component assembly step for mounting a first door component to the door and a second door-component assembly step for mounting a second door component to the door; and the method further comprises, between the first door-component assembly step and the second door-component assembly step, a third door-holder putting-in step, executed after the first door-component assembly step, for putting the door holder holding the door transversely inside the base; a third door-holder reception keeping step, executed after the third door holder putting-in step, for keeping the door holder holding the door put transversely inside the base; and a third door-holder putting-out step, executed after the third door-holder reception keeping step, for putting the door holder holding the door transversely outside the base.

* * * * *